United States Patent [19]

Owen

[11] Patent Number: 5,838,561
[45] Date of Patent: Nov. 17, 1998

[54] AUTOMATIC CONTROL LOOP MONITORING AND DIAGNOSTICS

[75] Inventor: James Gareth Owen, Montreal, Canada

[73] Assignee: Pulp and Paper Research Institute of Canada, Pointe-Claire, Canada

[21] Appl. No.: 722,920

[22] Filed: Sep. 23, 1996

[30] Foreign Application Priority Data

Apr. 29, 1996 [GB] United Kingdom ................ 9608953.7

[51] Int. Cl.$^6$ ..................................................... G06F 19/00
[52] U.S. Cl. .......................... 364/152; 364/552; 364/554; 364/468.15
[58] Field of Search ..................................... 364/148, 152, 364/156, 178, 179, 176, 551.01, 552, 554, 468.15, 468.16, 468.17, 582

[56] References Cited

U.S. PATENT DOCUMENTS

| | | | |
|---|---|---|---|
| 3,829,848 | 8/1974 | Eickelberg et al. | 340/238 |
| 4,855,897 | 8/1989 | Shinskey | 364/152 X |
| 4,885,676 | 12/1989 | Zweighaft | 364/178 |
| 4,964,388 | 10/1990 | Lefebvre | 123/435 |
| 5,150,289 | 9/1992 | Badavas | 364/154 |
| 5,196,997 | 3/1993 | Kurtzberg et al. | 364/152 |
| 5,239,456 | 8/1993 | Badavas et al. | 364/154 |
| 5,249,119 | 9/1993 | Kaseda et al. | 364/185 |
| 5,293,323 | 3/1994 | Doskocil et al. | 364/554 X |
| 5,301,118 | 4/1994 | Heck et al. | 364/468.16 |
| 5,329,465 | 7/1994 | Arcella et al. | 364/551.01 |

FOREIGN PATENT DOCUMENTS

| | | |
|---|---|---|
| 0 297 951 | 1/1989 | European Pat. Off. . |
| 0 481 971 B1 | 9/1994 | European Pat. Off. . |
| 2 968 470 | 5/1994 | France . |
| 93/06537 | 4/1993 | WIPO . |

OTHER PUBLICATIONS

Dreams Vs. Reality: A View from Both Sides of the Gap, by W.L. Bialkowski Control Systems 92, Whistler, B.C. (1992).
Automatic Monitoring of Control Loop Performance by T. Hagglund, Control Systems 94 (1994).
Assessment of Control Loop Performance by T.J. Harris, Can. J. chem. Eng. 67, pp. 856–861, 1989 (Oct.)
Performance Assessment Measures for Univariate Feedback Control by L.D. Desborough and T.J. Harris, Can, J. Chem. Eng. 70, pp. 1186–1197, 1992 (Dec.).
Performance Assessment Measures for Univariate Feedforward/Feedback Control by L.D. Desborough and T.J. Harris, Can. J. Chem. Eng. 71, pp. 605–616, 1993 (Aug.).
Towards Mill–Wide Evaluation of Control Loop Performance by M. Perrier and A. Roche, Control Systems 92 (1992).
An Expert System for Control Loop Analysis by P. Jofriet, C. Seppala, M. Harvey, B. Surgenor, T. Harris, Preprints of the CPPA Annual Meeting 1995.
Monitoring and Diagnosing Process Control Perforrrmance: The Single Loop Case by N. Stanfelj, T. Marlin and J. MacGregor, Proc. of the American Control Conference, pp. 2886–2892, 1991.
Intelligent Actuators—Ways to Autonomous Actuating Systems by R. Isermann and U. Raab, Automatica, 29, #5, pp. 1315–1331, 1993.

(List continued on next page.)

*Primary Examiner*—Joseph Ruggiero
*Attorney, Agent, or Firm*—E. E. Pascal; R. A. Wilkes

[57] ABSTRACT

A method of diagnosing a malfunction of a process control system which includes at least one closed loop control loop comprising measuring a histogram of tracking error of the control loop, determining distortion of the tracking error relative to a Gaussian distribution, and indicating a malfunction in the process in the event a deviation from the Gaussian distribution of the tracking error exceeds predetermined limits.

21 Claims, 17 Drawing Sheets

OTHER PUBLICATIONS

Analysis of Nonlinear Stochastic Systems by Means of the Fokker–Planck Equation by A.T. Fuller, Int. J. Control, 9,6, pp. 603–655, 1969.

Approximate Analysis of Nonlinear Systems Driven by Gaussian White Noise by D. Xue and D. Atherton, Proc. of the American Control Conference, pp. 1075–1079, 1992.

The Theory of Statistics by G.U. Yule and M.G. Kendall, Griffin, 1953.

|  | CONTROL LOOP 1 | CONTROL LOOP 2 | CONTROL LOOP 3 | CONTROL LOOP 4 |
| --- | --- | --- | --- | --- |
| INDEX | 4.2 | 2.9 | 9.6 | 4.8 |
| PRIMARY RESONANT FREQUENCY | 0.01 Hz | 0.034 Hz | 0.3 Hz | 0.012 Hz |
| SECONDARY RESONANT FREQUENCY | N/A | N/A | 0.01 Hz | 0.08 Hz |

EQUIVALENCE CLASS 1
CONTROL LOOP 1
CONTROL LOOP 2
CONTROL LOOP 4

EQUIVALENCE CLASS 2
CONTROL LOOP 3

N/A = NOT APPLICABLE BECAUSE VARIANCE ASSOCIATED WITH THE SECOND PEAK IS LESS THAN THE PRESET THRESHOLD AND THE RESPONANCE IS NOT SIGNIFICANT.

FIG. 5

PAPRICAN/AVENOR LOOP PERFORMANCE EVALUATION PROJECT
SUMMARY OF RESULTS FOR THE GROUP group11.txt INTERACTIONS BETWEEN TWO OR MORE LOOPS ARE SUSPECTED. POSSIBLY INTERACTING LOOPS HAVE BEEN GROUPED TOGETHER, AND TAGS WITH HIGHER MODIFIED INDICES WITHIN EACH GROUP ARE MORE LIKELY A SOURCE OF MALFUNCTION AND SHOULD BE CHECKED FIRST.

| TAG [1] | MOD. IND. | IND.[2] | STD[3] | LIKELY CAUSE [4] |
|---|---|---|---|---|
| GROUP 1 | | | | |
| PIC425 | 14.67 | 53.94 | 0.067081 | TUNING/INTERACTION |
| PIC424 | 114.3 | 47.55 | 0.116640 | ACTUATOR/SENSOR |
| PIC436 | 1.38 | 3.99 | 0.012283 | TUNING/INTERACTION |

EQUIVALENCE CLASS OF POSSIBLY INTERACTING LOOPS

THE FOLLOWING LOOP(S) ARE JUDGED TO BE
INDIVIDUALLY MALFUNCTIONING:

| TAG | IND. | STD | LIKELY CAUSE |
|---|---|---|---|
| PIC390 | 17.29 | 0.06 | TUNING/INTERACTION |

[5] TREND DETECTED (INDEX MAY BE INFLATED)

LEGEND

[1] MODIFIED PERFORMANCE INDEX: THE LARGER THIS NUMBER, THE MORE LIKELY THE TAG IS TO BE A SOURCE OF A MALFUNCTION.

[2] RAW PERFORMANCE INDEX

[3] RAW STANDARD DEVIATION OF TRACKING ERROR

[4] DIAGNOSTIC INDICATION

[5] WARNINGS THAT INDICATE MALFUNCTION MAY BE CAUSED BY AN UPSET CONDITION RATHER THAN A PROBLEM WITH THE CONTROL

PIC425: AUTO SLICE VACUUM
PIC424: TRANSFER BOX VACUUM
PIC436: FOUR DRINIER VACUUM HEADER
PIC390: ANTI-BLOW BOX VACUUM

FIG. 6

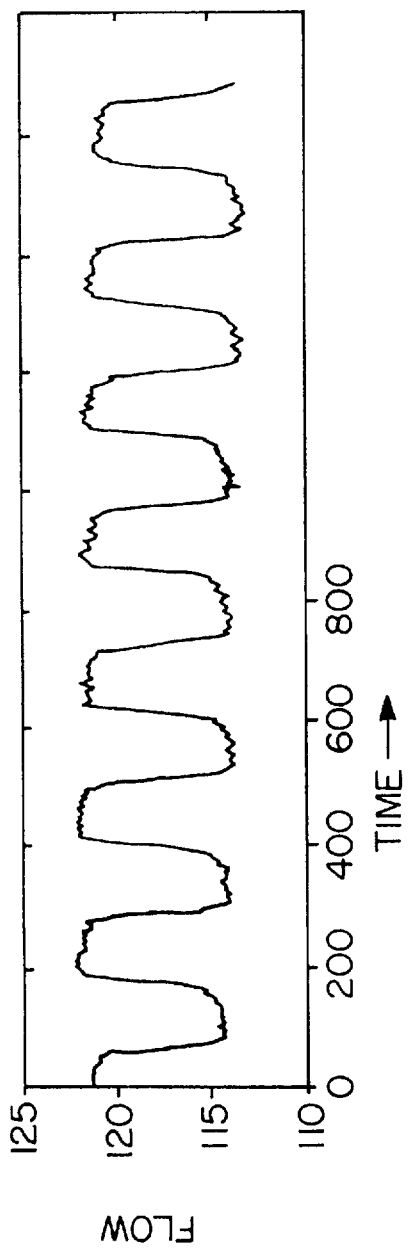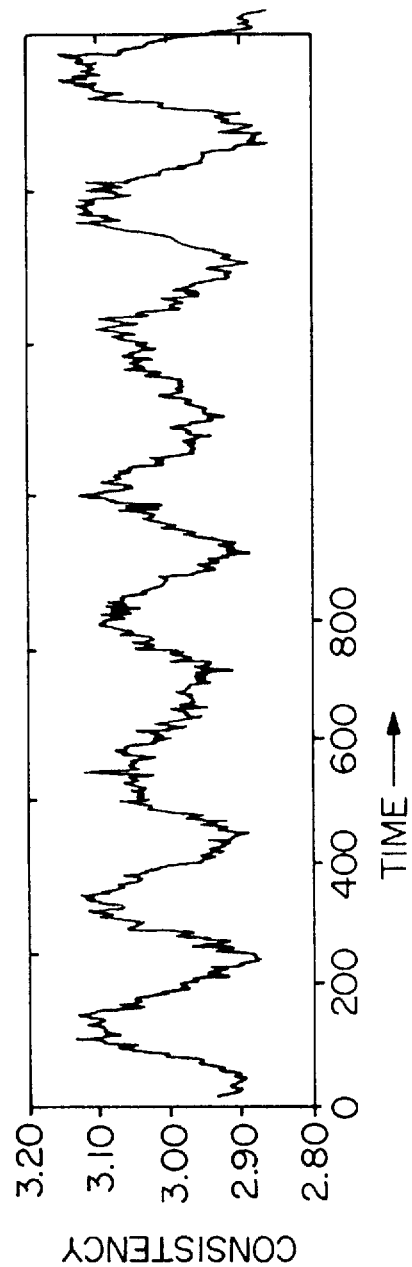

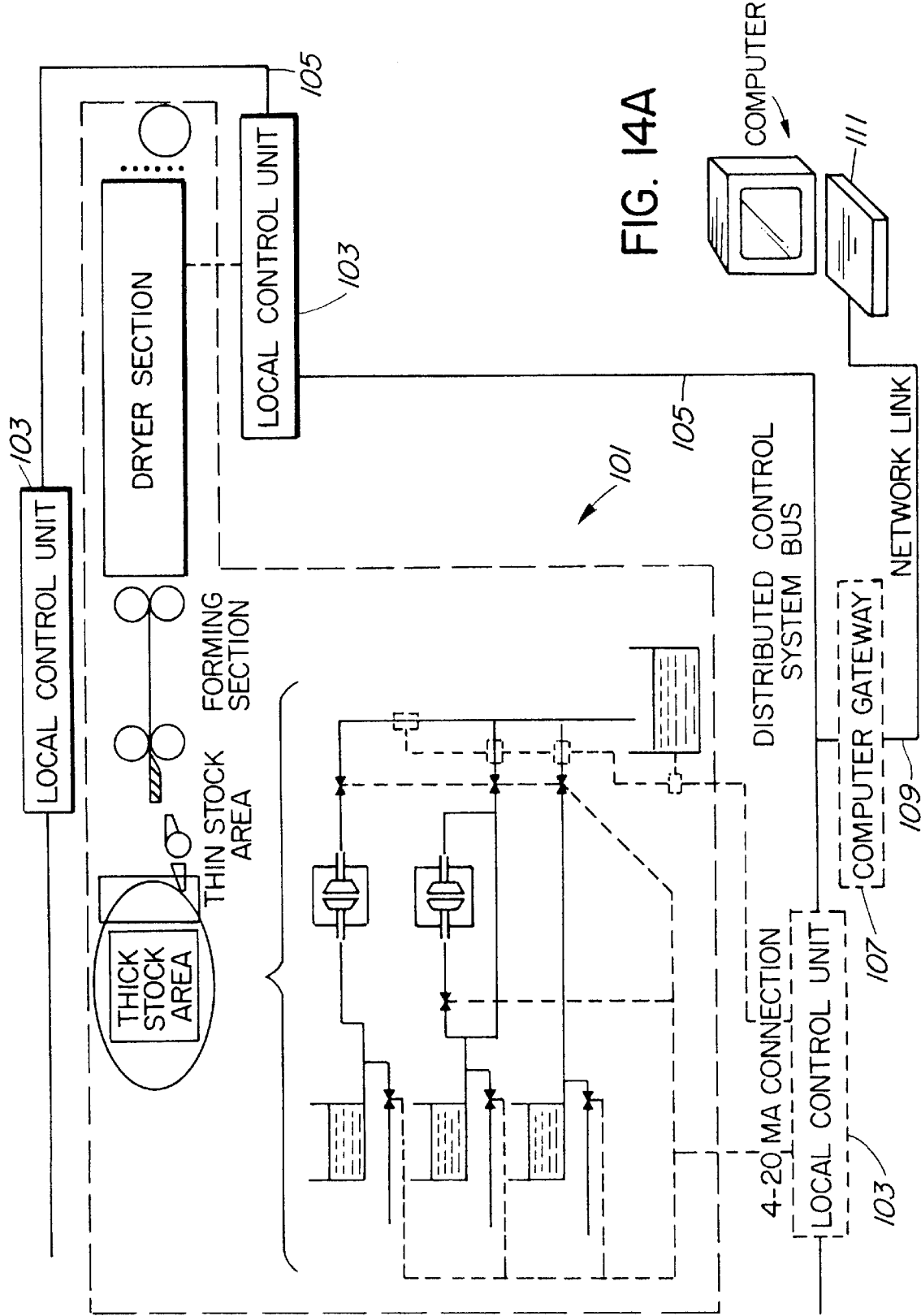

AUTOMATIC CONTROL LOOP MONITORING AND DIAGNOSTICS

FIELD OF THE INVENTION

The present invention relates to apparatus and methods for detecting and diagnosing malfunctions in process control systems for large, complex and continuous manufacturing systems such as a pulp and paper mill.

BACKGROUND TO THE INVENTION

In a modern large and complex continuous manufacturing system there are typically many hundreds of physical quantities being automatically controlled by a computerized system employing on-line data acquisition, decision making, and physical adjustment of actuators. The main purpose of such a control system, apart from performing the basic sequential tasks necessary to run the process, is to maintain optimal operating conditions by minimizing the effect of natural fluctuations (such as raw material variations) on the quantities under control. Several common sources of control system malfunction can disrupt this basic objective of the control system, without necessarily triggering process alarms or other indications of failure. Causes of malfunctions can include: poor choice of control algorithm or tuning constants, valve stiction, deterioration of sensors, or a poor initial choice of control strategy. These types of incipient problems can persist undetected, often with severe negative economic consequences which stem from loss of product uniformity or sub-optimal operating conditions. The extent of this type of malfunction can be very great when there are many variables are under control and maintenance resources are limited. For instance, in a typical integrated pulp and paper mill 20–60% of the 1000–5000 variables under automatic control may be contributing some additional variation due to various types of control malfunction as noted in "Dreams vs Reality: A View from Both Sides of the Gap", by W. L. Bialkowski, and "Control Systems 92, Whistler, B. C., A Mill Prototype for Automatic Monitoring of Control Loop Performance", Pulp and Paper Report, Paprican, by J. G. Owen, D. Read, H. Blekkenhorst, and A. A. Roche.

In most industrial plants the vast majority of variables under control are regulated individually by manipulation of a single process input. As such, the process control system can be thought of as being divided into separate units or "control loops", each responsible for the control of a separate quantity. Consequently, tracing the source of a control system malfunction requires localization of the effected loop from among the many hundreds of control loops in the plant.

The primary symptom of process control malfunctions is increased variability in the quantity under control. Consequently, much of the prior art has used various manifestations of elevated levels of variance to locate malfunctioning control loops, e.g., U.S. Pat. No. 4,885,676 and U.S. Pat. No. 5,249,119. The drawback of the approach is that changes in the level of variability contributed by malfunctions of the process control system cannot be distinguished from the effects of changes produced by other external perturbations such as those arising from raw material variations or turbulent flows.

Another approach taken in the prior art is the direct detection of a subclass of control malfunctions caused by valve or actuator failure, e.g., U.S. Pat. No. 5,329,465 and U.S. Pat. No. 3,829,848. The scope of these techniques, however, is limited to a particular type of malfunction, and special instrumentation must be installed and connected to each actuator or valve to be monitored.

Extensive material has been published in the academic literature, describing various methods for control loop monitoring and diagnostics. Much of this literature has focused on ways to overcome the limitation of techniques based on measuring the absolute level of variability previously mentioned. For instance, in "Automatic Monitoring of Control Loop Performance", by T. Hagglund, Control Systems '94 a procedure to detect process variable oscillations resulting from control loop malfunctions is presented. However, both this technique and classical techniques based on detection of power spectrum resonances, are limited to detection of control malfunctions which induce oscillation and where there is an absence of inter-loop interaction (see below). A major step towards a more general and robust method of quantification of control loop performance was made in the paper "Assessment of Control Loop Performance", by T. J. Harris, Can. J. Chem. Eng., 67, pp. 856–861, 1989. Harris proposed assessing control performance using a comparative measure of variance. This performance index was defined as the ratio of the observed level of variance of a controlled variable to the minimum variance achievable by a minimum variance controller. Harris further devised a means of computing the index from observation of the closed-loop operating data (i.e. without requiring any invasive process perturbation) and an estimate of the delay between the process input and output. As a single number, this index provided a very easily interpreted quantification of loop performance, ideal for use in a computer method for detecting control malfunctions. Furthermore, the technique for evaluating the index has the advantage of being unaffected by fluctuations in the intensity of external disturbance, since such changes effect both the observed variance and the minimum variance estimate by the same factor.

These advantages prompted other researchers to generalize the techniques. For instance in "Performance Assessment Measures for Univariate Feedback Control", by L. D. Desborough and T. J. Harris, Can, J. Chem. Eng, 70, pp. 1186–1197, 1992, a method of estimating a normalized form of Harris' index is presented, together with the statistical properties of the estimator. In "Performance Assessment Measures for Univariate Feedforward/Feedback Control", by L. D. Desborough and T. J. Harris, Can, J. Chem. Eng, 71, pp. 605–616, 1993, these results are extended to include performance assessment of single loop feedback in combination with feedforward control. Industrial application of these techniques is described in "Towards Mill-Wide Evaluation of Control Loop Performance", by M. Perrier and A. Roche, Control Systems '92, and "An Expert System for Control Loop Analysis", by P. Jofriet, C. Seppala, M. Harvey, B. Surgenor, T. Harris, Preprints of the CPPA Annual Meeting, 1995. In "Monitoring and Diagnosing Process Control Performance: The Single Loop Case" by N. Stanfelj, T. Marlin and J. MacGregor, Proc. of the American Control Conference, pp. 2886–2892, 1991, these techniques are further investigated, and a method for distinguishing excess variability due to poor control design from that due to poor model estimation is presented for cases where there is continuous set point variation.

The ability of these techniques to distinguish elevated variability arising from changes in external disturbances from that due to control malfunctions is limited however to cases where only the intensity rather than the fundamental character of the external disturbances changes. The assessment of performance is in fact biased when the character of those disturbance is changed, for example due to a malfunction in the control of another quantity which is dynamically related to the controlled variable. This phenomenon is illustrated in Examples 1 and 2. This effect could conceivably be overcome by the use of a direct multivariable extension of the Harris index and its method of computation. The practical difficulty with such a generalization is that it would require practical extensive process modelling and experimentation in order to find the multi variable extension of the process delay, i.e., the process interactor transfer function matrix. The complexity and cost of this type of extensive modelling would make this approach unsuitable for large scale industrial implementation. Another source of bias in control loop performance assessment using these techniques is the effect of temporary upsets in the process which induce nonstationary disturbances to the loop under consideration, in violation of the prior assumptions made by Harris and other prior contributors to the prior art. Yet another bias in the evaluation of performance can occur for malfunctions which are induced by a non-linearity in the loop under assessment, such as that caused by high levels of friction in a valve or actuator. This bias has its roots in the violation of the assumption of approximate process linearity made in the prior art, which fails to hold for this class of control malfunctions. These commonly occurring non-ideal conditions will cause any method based on the techniques described in the above papers to yield false positive and false negative indications of control loop malfunction.

There are a number of techniques available in the commercial domain for testing of valves and actuators for functional defects such as stiction. Some of these techniques have been mentioned in various forms in the open literature, e.g., "Intelligent Actuators—Ways to Autonomous Actuating Systems", by R. Isermann and U. Raab, Automatica, 29, #5, pp. 1315–1331, 1993 and U.S. Pat. No. 3,829,848. All employ some variant of the following procedure:

a) the controller output is moved according to some preset sequence;
  b) the response, either or the valve itself or some other measurement of the process condition, is tested for departures from a "normal" characteristic;
  c) any detected departures provide a diagnostic.

This type of technique can be automated so that the procedure is performed on-line. The drawback is that the invasive probing of the valve carries a risk of causing upsets and generating additional process variability. On the other hand, if routine controller output signals to the valve or actuator are to be used instead of a probing signal, then a continuous measurement related to the actuator/valve position must be available in addition to the quantity being controlled. This restriction is a consequence of the fact that the relationship between the calculated controller output or desired process input and the measured controlled variable is completely explained by the control method itself when the process is operating in closed-loop; as such it can reveal no information about the process in the absence of any set-point adjustments. Hence, variants of the above techniques which use routine data to monitor valves or actuators require a second measurement point which is strongly related to the actuator valve position and not completely dependent on the computed centralization.

It has been noted in the academic literature that nonlinear elements in a control loop will induce limit cycles in process variables which have a non-normal distribution. The pioneering work in this area was done by Fuller in "Analysis of Nonlinear Stochastic Systems by Means of the Fokker-Planck Equation", by A. T. Fuller, Int. J. Control, 9, 6, pp. 603–655, 1969 who derived partial differential equations describing the dependence of the controlled variable probability density function on the process dynamics and the nonlinearity. These equations were simplified in "Approximate Analysis of Nonlinear Systems Driven by Gaussian White Noise", by D. Xue and D. Atherton, Proc. Of the American Control Conference, pp. 1075–1079, 1992 for some common process models and memoryless nonlinearities with disturbances represented by white noise. In both cases this work is of a theoretical nature, and was confined to derivation of the probability density function for known process models. Tests for non-normality of the probability density function of a time-series using estimation of the 4th moments have also beep proposed in the open literature for other purposes, for example "The theory of Statistics", by G. U. Yule and M. G. Kendall, Griffin, 1953. However, this type of test is limited by the requirement that the observations of the time-series be independent, a condition which is never satisfied for the time series generated by the measured value of a limit cycling control loop. A non-normality test using this technique was also proposed in U.S. Pat. No. 5,239,456 "Method and Apparatus for Process Control with Optimum Setpoint Determination". The purpose of the test as it was proposed in this patent was to provide an alarm if the key technical assumption of the patented technique failed to hold; it was not used to provide a control system diagnostic.

SUMMARY OF THE INVENTION

The present invention relates to a method and apparatus which permits automatic assessment of control loop performance in the multi-loop interactive and nonlinear dynamic environment typical of industrial settings. The invention localizes malfunctions in the process control system by analyzing operating data routinely recorded by the plant data acquisition system. The invention can also derive a diagnostic for malfunctions which have been localized, and can quantify the severity of any detected malfunction in terms of the amount of variability it contributes to the quantity under control.

Prior process data required for the analysis may include:
  i.) an estimate of which groups of controlled variables may exhibit significant mutual dynamic interaction;
  ii.) the delay between making a change at each controller output and observing the first sign of its effect on the controlled variable;
  iii.) the "order or magnitude" of the open-loop time constant.

The latter two estimates are required for each control loop to be monitored. They may be obtained from routine data if frequent set-point changes are made; otherwise a "one-time-only" bump test may be required.

A method in accordance with the present invention detects control malfunctions using the following procedure. Operating data is collected simultaneously from the preselected lists of loops judged likely to exhibit mutual interaction. This operating data comprises two time-series for each loop: the controlled variable measurement and the control loop set point. The data is collected over a period at least 100–500 times the longest open-loop time constant among the loops in the group. Two types of performance index may then be computed for each loop under separate assumptions about the state of disturbances acting on the loop. The "raw index" quantifies the amount by which the observed variance of the tracking error exceeds its minimum achievable value after any nonlinear elements have been removed from the loop. This index correctly quantifies performance where disturbances to the loop conform to normal external conditions. Prior estimates of the process delay and time constant are used to perform this calculation. The method then tests for any interactions between control loops which may be inflating the estimate of the raw index by perturbing the loop being analyzed in an abnormal manner. If such variation is detected for a particular loop a "modified index" is then computed. The modified index is an estimate of the same comparative measure of variability, but with the effect of potentially abnormal disturbances removed from the calculation. As such, the modified index is a valid measure of the loop performance under the assumption that the detected abnormal disturbance has external origin. Hence if a loop is deemed to be interacting with others in the group, the raw and modified indices reflect the status of loop performance under the contrasting assumptions that any interactive abnormal variation is internally or externally produced. Taken together, the two indices allow the user of the system to divide control loops into three categories: those definitely malfunctioning, those definitely not malfunctioning, and those which may be malfunctioning or being perturbed by interacting malfunctioning loops. Other information may also be used in this calculation to assist in making the distinction, as described under the preferred embodiments.

The diagnostic component of the invention proceeds by computing the histogram of the tracking error for each loop designated potentially malfunctioning (i.e., where the raw index exceeds some predefined level). The kurtosis and skewness of each histogram is then quantified by calculating the height of the center bar of the histogram relative to its expected height under the assumption that the tracking error is normally distributed with either zero or the sample mean and the sample variance. The skewness is quantified by comparing the number of samples in excess of either the sample mean or zero with the expected number (i.e., half the number of samples) under the same assumption. Under this null hypothesis, the statistical significance of any departure of either statistic from 0 is calculated, taking into account any inter-sample correlation of the tracking error time-series.

In accordance with an embodiment of the invention, a method of detecting malfunction of a process control system which includes at least one closed loop control loop is comprised of measuring a histogram of tracking error of the control loop, determining distortion of the tracking error relative to a Gaussian distribution, and indicating a malfunction in the process in the event a deviation from the Gaussian distribution of the tracking error exceeds predetermined limits.

In accordance with another embodiment, a method of automatic assessment of control loop performance of an industrial machine is comprised of collecting operating data comprising time series of controlled variable measurements and control loop set points simultaneously from predetermined control loops, for a period of at least approximately 100 times a longest time constant of the predetermined control loops, subtracting measured variable data from set point data to obtain tracking errors, determining an amount by which observed variance of a tracking error exceeds an ideal minimum value achievable after non-linear elements have been removed from a loop, exploiting prior estimates of process delay and time constant in the calculation and representing the result as a raw index, testing for any interactions between control loops which may be inflating the estimate of the raw index in an abnormal manner, determining a modified raw index for a particular loop in the event the inflated estimates are detected, and distinguishing between control loops that are malfunctioning, those that are not malfunctioning, and those that are possibly malfunctioning and are perturbed by interacting malfunctioning control loops, based of the raw index and the modified raw index.

In accordance with another embodiment, a method of automatic assessment of control loop performance of and industrial machine is comprised of (a) identifying a current control loop in a group of control loops, (b) obtaining operating data and prior operating data for the control loop, (c) calculating a raw performance index for the control loop, (d) indicating the current control loop as potentially malfunctioning in the event the raw performance index is greater than a predetermined threshold, (e) in the event the control loop is indicated as potentially malfunctioning, computing a fast Fourier transform of a tracking error, and filter products of the transform to remove spurious peaks, (f) identifying primary and secondary spectral peaks contributing more than a threshold variance in a predetermined bandwidth for the control loop, (g) selecting another control loop in the group of control loops and repeat steps (a)–(g) until a last control loop in the group has been processed, (h) divide potentially malfunctioning loops with approximately coincident spectral peaks into possibly interacting classes, (i) determine a modified performance index for all control loops belonging to a class, and (j) apply a histogram test to spectral peaks of all control loops in a class to determine a category of malfunction.

In accordance with another embodiment, a method of determining a category of malfunction of a process is comprised of tracking error variations of narrow spectral bandwidth in each of plural control loops of the process, comparing spectral peaks of the error variations to detect coincidences of peaks which are indicative of interaction between the plural control loops, and quantifying effects of the error variations which have the coincidences of peaks, and as a result determining malfunctioning of a control loop.

BRIEF DESCRIPTION OF THE DRAWINGS

FIG. 5 illustrates grouping of potentially malfunctioning control loops into an interacting equivalence class, FIG. 6 shows a sample text output of the method, indicating the partition of potentially malfunctioning loops into a subgroup where potential mutual interaction may be inflating performance indices, FIGS. 9A and 9B show the flow and consistency time-series for Example 1, FIG. 10 show the flow and consistency power spectra for Example 1, FIGS. 14A and 14B are general block diagrams of an embodiment of the invention.

DESCRIPTION OF THE PREFERRED EMBODIMENTS

Upon setup of the control system which uses the present invention, prior or reference information on the process dynamics should be collected and organized. This information need be updated only when either changes are made to the process under control or to the choice of manipulated/controlled variable pairing; otherwise it does not change either between successive analyses performed with the method or between readjustments of the control tuning constants.

There are two structures for this prior information, one relating the inter-loop dynamics, the other representing dynamic information about each separate loop. Estimates of which controlled variables have the potential for significant mutual interaction are made at startup, based on a qualitative understanding of the process behaviour. This information is then used to partition control loops into groups which may exhibit significant intra-group mutual interaction, but where inter-group interaction is less likely or less pronounced. These partitions are then represented by a series of lists comprising names used by the control system for each control loop in the respective group. The method collects and processes data from control loops belonging to each list simultaneously. These lists constitute the first prior information structure.

Figure 7:
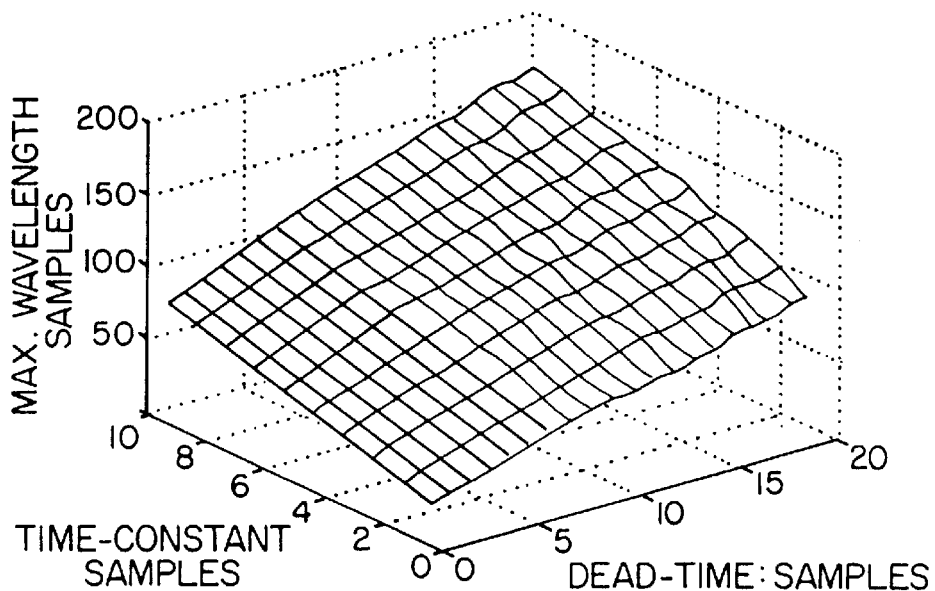
FIG. 7 shows graphs depicting prior wavelength estimates for closed-loop transfer function resonances for various process dynamics.

The second prior information structure is a file associated with each separate control loop containing an estimate of the delay between manipulated and controlled variables, the approximate open-loop process time constant, and the sample time. A further optional item that may be included is an allowable range for closed-loop resonant frequencies caused by poor tuning of the control. Upper and lower bounds on the frequency of any resonances caused by poor controller tuning, which are independent of the particular choice of tuning constants, can be found from prior open-loop dead-time and dominant time-constant estimates. Plots illustrating the dependence of these upper and lower limits on dead-time and open-loop time-constant are shown in FIG. 7, and the formula describing these surfaces is described later. The purpose of including these limits is that in some cases they can be used by the method to distinguish the effects of externally and internally imposed resonances in the controlled variable. Additional prior information pertaining to each individual loop may also be included as needed in these files, such as outlier limits for detecting abnormal process conditions.

Figure 2:
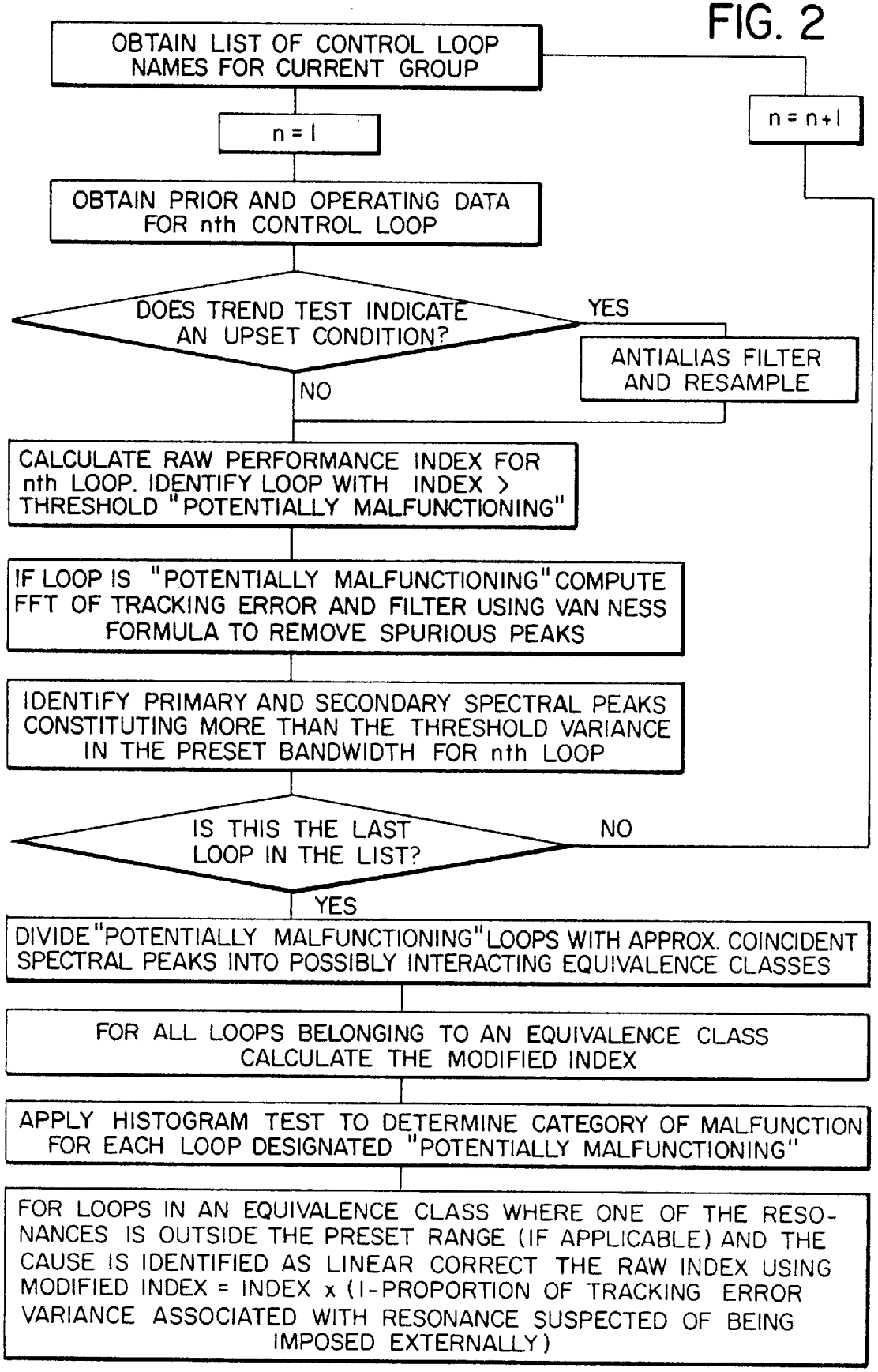
FIG. 2 shows a flow diagram indicating the general sequence of calculations performed by the method to locate and diagnose control loop malfunctions.

The method uses the prior information to interpret the data from each cycle of operating data acquisition and analysis. An overview of the sequence of actions taken during this cycle is shown in FIG. 2. After simultaneous extraction of the operating data from all the loops in a preselected group, the raw index of performance is calculated based on the computed tracking error (set point—controlled variable) for each loop. A generalization of the index proposed by Harris and others is used for this purpose:

$$\text{raw generalised index} = \frac{\text{observed tracking error variance}}{\text{minimum achievable variance with linear actuators and sensors}} \quad (1)$$

Figure 8A:
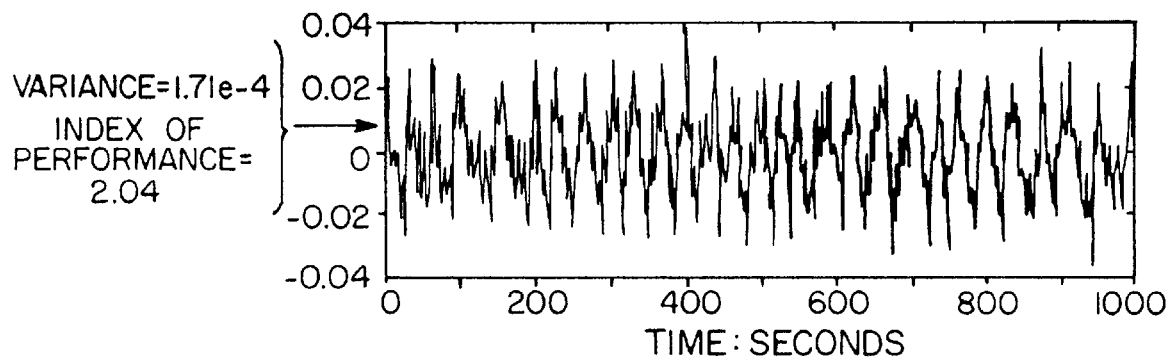
FIGS. 8A and 8B show a simulated random limit cycle with and without valve stiction, respectively, with predicted potential variability improvement using standard methods being compared to the variability improvement actually realized by removal of the source of simulated stiction.
Figure 8B:
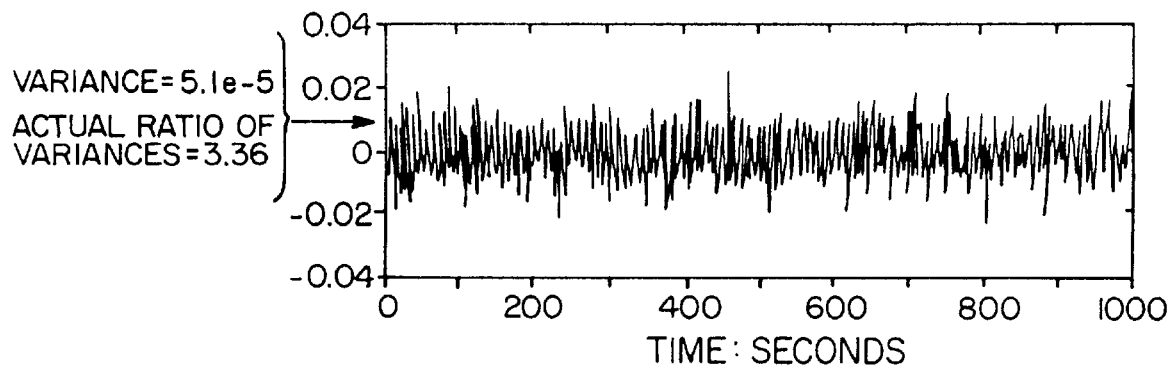

For control loops with predominantly linear elements, this index and its method of computation are functionally identical to the technique taught in the prior art. However, in cases where excess variation is caused by limit cycles driven by a nonlinearity, the tendency of standard methods to underestimate the severity of malfunctions is avoided by employing this generalized form of the performance index and its means of computation (as proposed in this invention). For example, FIG. 8A shows a dynamic simulation of a control loop exhibiting the effects of valve stiction. The index of performance as calculated by the technique proposed in the prior art is 2.1 (at the high end of the normal range). When the valve stiction element was removed from the simulation, the variations in the controlled variable are as shown in FIG. 8B. The variance was reduced by a factor of 3.6, significantly greater than the figure of 2.1 predicated by the standard performance index. The raw generalized index (eq: 1) proposed in accordance with the present invention was 3.3 in this case, providing a more realistic estimate of the excess variation caused by the malfunction.

Figure 1:
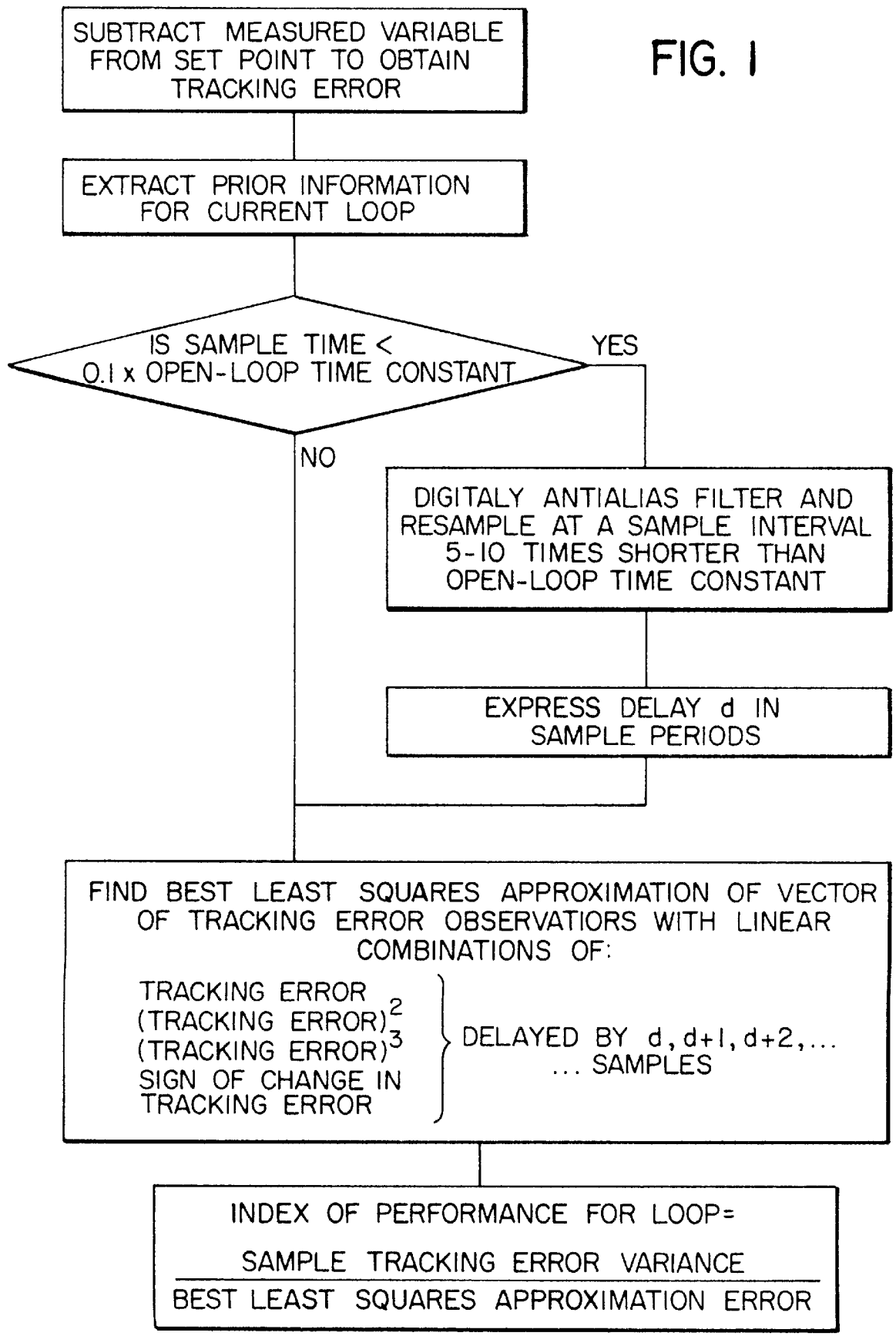
FIG. 1 shows a flow diagram indicating the sequence of calculations performed to calculate the raw index of performance for each loop.

The method for determining the generalized raw index is illustrated in FIG. 1. The technique uses the equivalence:

$$\text{raw index} = \frac{\text{observed tracking error variance}}{\text{variance of conditional expectation of tracking error from observations at least } d \text{ samples in the past}} \quad (2)$$

and the denominator is approximated by the process described in FIG. 1.

The method preferably also performs two other maneuvers as shown in FIG. 2 to ensure an unbiased univariate performance estimate. In cases where the sample interval is shorter than 1/10th of the estimated process time-constant, the tracking error is lowpass filtered using an antialiasing filter with a cut-off frequency between 10–20 times the reciprocal of the estimated process time-constant (in radians per sample) and then resampled with a sampling interval 0.1–0.2 times the estimated dominant process time-constant. The outcome of this procedure is that the minimum variance estimate in (1) is based on a minimum variance controller with a longer assumed control interval, equal to the sample interval of the resampled data rather than the sample interval of the original data. This avoids underestimating the minimum variance when using data obtained with a sample interval much shorter than the open-loop time-constant (stemming from an ideal control action which would have to employ unrealistically large and frequent control moves), and the consequent upward bias in performance index evaluation.

Another precaution taken when evaluating the raw index, is against the bias caused by upset process conditions. A statistical test is preferably applied to the tracking error data to detect upsets; if the result is positive, either the user is warned of the potential bias or the cycle of data acquisition repeated to capture a non-upset condition. The test measures the statistical significance of the statistic D, which is sensitive to drifts in the tracking error of duration greater than one third of its length that would be associated with upset conditions:

$$D = \text{maximum of } (|m1|, |m3|)$$

where m1 and m3 are the means of the first and third thirds of the time-series. The null hypothesis is that the tracking error is a stationary random process with a power spectrum equal to M times the tracking error variance over a frequency band 0 to pi/M, where M is a preselected large number. Such a power spectrum describes a random process with significant low frequency components. The null hypothesis is invalidated with 95% confidence, and the presence of a drift indicated, if:

$$D > \text{standard dev of tracking error} \qquad (3)$$

x square root of 12M/L, where L is the number of samples

The main drawback of the prior art is erroneous performance assessment for well performing loops which are perturbed by disturbances from interacting malfunctioning control loops. The use of the modified index of performance by the invention to counter this effect and trace the root causes of malfunction is predicated on the characterization and detection of abnormal disturbances transferred through interaction. Characterization is based on a key observation, not known in the prior art, which is valid under physically reasonable assumptions: the only external abnormal disturbances to a normally functioning control loop which have the potential to artificially inflate the calculated index of performance are those with a narrow spectral bandwidth. This characterization is exploited by the invention to detect interaction which has the potential to create bias, without requiring additional process model building. In particular, tracking error variations of narrow spectral bandwidth can easily be identified by univariate Fourier transform methods, and the spectral peaks can then be compared to detect the coincidences which are indicative of interaction. By quantifying the effects only of those inter-loop disturbances which have the capability to induce errors in performance assessment, the technique provides much greater precision and simplicity than would be available with general correlation methods.

Figure 3:
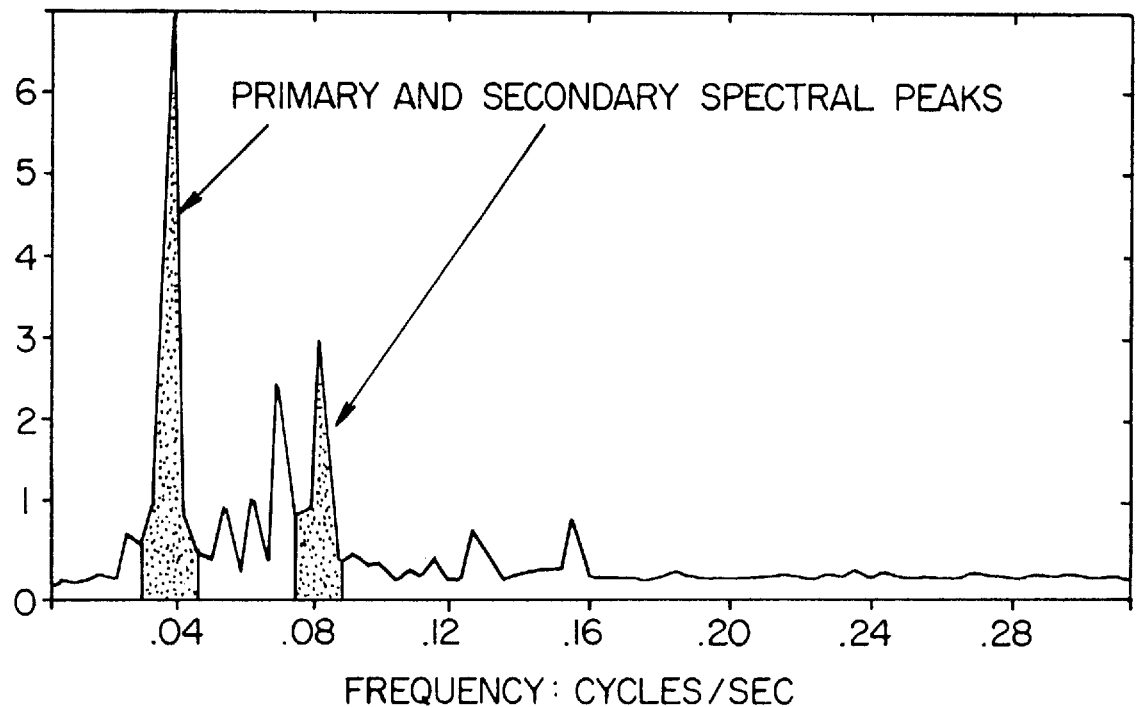
FIG. 3 shows an example of a calculated power spectrum, with primary and secondary peaks identified, together with shaded areas corresponding to the variance associated with those peaks over the preset bandwidth.

The details of this procedure are as follows: For each loop deemed potentially malfunctioning (raw index>preset threshold) the Fourier transform of the tracking error is evaluated. It is then windowed with a Daniel window whose bandwidth W periodogram ordinates is chosen so that W is the smallest integer which satisfies:

$$W \exp(W) > L \qquad (4)$$

which according to the Woodroofe Van Ness formula [Priestly], for long data lengths ensures that there should be no more than 50% relative error at any point in the estimated power spectrum with high probability. In order to characterize any spectral peaks the frequency of the maximum of the estimated power spectrum f1 is estimated. The center frequency of any secondary peak f2 is then evaluated by testing for a second maxima, over frequencies excluded from an interval around the first. The variance associated with primary and secondary maxima is evaluated by computing the area under the power spectrum estimate over an interval of fixed bandwidth bw about the two estimated frequencies f1 and f2 (see FIG. 3, wherein the shaded areas represent variance associated with primary and secondary spectral peaks). If either variance exceeds preset proportions of the overall tracking error variance then a spectral resonance is considered to be present at the corresponding frequency. Equivalence classes of control loops are then formed by associating loops where either primary or secondary resonant frequency is closer than a small fixed amount to either the primary or secondary resonant frequency of another loop. An example is shown in FIG. 5, where control loops 1,2, and 4 would be associated into a single equivalence class because of a common resonance at approximately 0.01 Hz.

In order to distinguish the symptoms and the causes of control loop malfunctions, a modified index of performance is then calculated for loops belonging to either one of two classes: loops belonging to an equivalence class of potentially interacting loops, or loops where a resonance is identified outside the prescribed range of wavelengths for the loop and that resonance is not caused by a limit cycle due to the presence of a severe nonlinearity in the loop. In the former case the modified index estimates the performance of the control loop if the common resonant component(s) of the variability arise(s) from disturbances contributed by an interacting malfunctioning loop and not generated internally. In this first case the modified index estimates the ratio between the variance and its estimated minimum achievable level that would have been observed prior to the onset of the external resonant disturbances. The true level of performance lies somewhere between the modified and raw indices depending on the source of the resonant component(s) in the observed variability. By contrast, in the second case the choice of representative measure of performance is more certain. If the prescribed limits have been set correctly and the judgment of the absence of a limit cycle is correct then any resonance outside the prescribed limits must be contributed by an external malfunction. Thus by excluding the effects of the resonant variation outside those limits, the modified index quantifies the performance independently of the abnormal external disturbance. In both cases the modified index is calculated in accordance with the following formula:

$$\text{Modified index} = \text{index} \times (1 - \text{proportion of the tracking error variance with resonance suspected of being imposed externally}) \qquad (5)$$

Distinguishing excess variation caused by random limit cycles from other sources is fundamental to selecting a corrective action. Such limit cycles are caused by defects in the actuator, valve or sensor which introduce a severe nonlinearity in the control loop. Since the vast majority, if not all, actuator or valve malfunction increase variability through this mechanism, the presence of a limit cycle is strongly suggestive of such a cause. In such situations choosing an alternative control strategy using the same faulty element, or retuning the control law is unlikely to yield any global improvement of variability. Conversely, recognition of other mechanisms of excess variability, such as cyclical variations produced by underdamped closed-loop dynamics, can allow maintenance to be focused on more easily rectified factors such as tuning constants and control strategy. The phenomenon that the invention uses to detect limit cycles is their tendency to produce non-Gaussian distortion of the tracking error histogram. If the disturbances to a control loop are not caused by an abnormal external condition, their probability density function will be approximately Gaussian. This observation is a consequence of the central limit theorem of classical statistics, and has been thoroughly corroborated experimentally in many situations.

If the open-loop dynamics of the actuator, sensor, and process are roughly linear for variations around the set-point (s), it follows that the tracking error will also have an approximately Gaussian probability density function. This will be true even if the choice of tuning constants or control strategy is causing excess variability by amplifying (or failing to attenuate) the disturbances. On the other hand highly non-linear open loop dynamics due, for example to valve hysteresis, that cause limit cycles in closed-loop, tend to distort the Gaussian probability density functions of the disturbances by suppressing the relative frequency around the mean value relative to the Gaussian bell, a characteristic known as kurtosis or introduce asymmetry in the relative frequency about the mean, a characteristic known as skewness.

Figure 4:
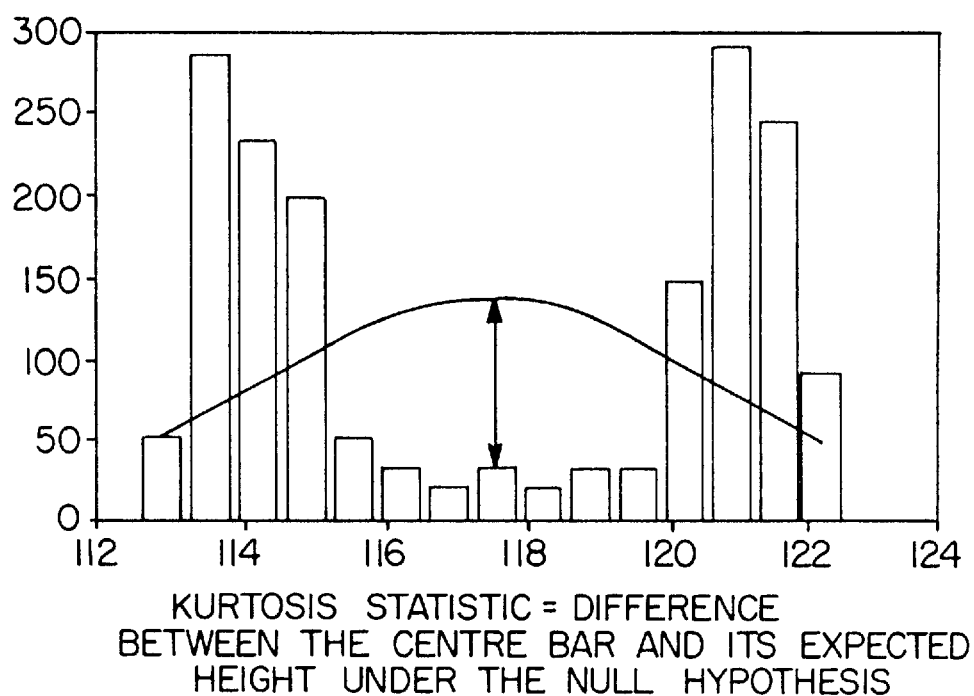
FIG. 4 shows the histogram of the tracking error for the flow controller malfunction of Example 1, which was known to be caused by valve stiction. The statistic used to quantify kurtosis is illustrated.

An example is shown in FIG. 4 for the flow tracking error time series shown in FIG. 9A where the characteristically flat topped limit cycles are caused by valve stiction. The generality of this observation can be deduced from research results reported by Xue and Atherton and Fuller and has been extensively verified by simulation and plant observation. This reasoning establishes the preferred technique of using a statistical measure of kurtosis (and optionally skewness) as a means of distinguishing limit cycles from other pathological variations. The statistic used to measure kurtosis is:

$K$=height of the tracking error histogram bar between+and-$W$ of the mean centered on zero number of samples×area under normal density between+and-$W$ of the mean (6)

The statistic used to measure skewness is $S_k$=number of tracking error observations greater than 0-half the total number of tracking error time-series observations.

Under the assumptions that disturbances are described by stationary random processes and that the data set is sufficiently large, the invention uses a hypothesis test to recognize statistically significant departures of K and/or S from 0. If a null hypothesis that tracking error variations have Gaussian probability distribution is adopted, this hypothesis test detects limit cycles by measuring the confidence that the observed K and/or S is inconsistent with the null hypothesis. The method for performing this test on K proceeds as follows:

1. If the sequence of observed tracking errors is x(k) where the index k ranges from 1 (the start of the sequence) to n (the end of the sequence), new sequence y(k) is generated by the following rule:
   if x(k) is within the limits of the center bar of the histogram then y(k):=1 otherwise y(k):=0
   A constant equal to the sample mean of y is then subtracted from each element y(k).
2. The autocorrelation function for the sequence y(k) is computed up to a fixed lag N. That sequence is denoted by R(j) where j ranges from –N to +N.
   The preferred method of calculating the autocorrelation sequence is to compute an autoregressive model for the time-series y using standard least-squares methods, and estimate R from the autoregressive parameters.
3. The sum of the sequence y(k) prior to removing the sample mean, defined to be S, is the height of the center bar of the histogram. Under the null hypothesis the expected value of S is equal to the area under the Gaussian bell in the range of the center histogram bar multiplied by the number of samples. The variance of S is given by the formula:

$$Var(S) = \sum_{k=1}^{n-1} 2(n-k)R(k) + nR(0) \quad (7)$$

where R(.) is the estimated autocorrelation sequence,
n is the number of samples,
S=the sum of the sequence y(k) prior to removal of the sample mean, which is the height of the center bar of the histogram, and the expected value of S is equal to the area under the Gaussian curve in the range of the center histogram bar multiplied by the number of samples, i.e.

$$nerf\left(\frac{x}{1.414}\right)$$

where $\chi = \frac{W}{\text{sample standard deviation of } \chi(k)}$.

4. If there are a sufficient number of data points the probability density function for the random variable S is Gaussian. Under this assumption the confidence in the null hypothesis can be expressed:

$$\text{confidence} = nerf\left(\frac{x}{1.414}\right) \quad (8)$$

where $\chi$=absolute value of the difference between the expected value of S and its computed value divided by the estimated standard deviation of S as calculated from (7)

Negative or positive results for the limit cycle test can be decided by selecting appropriate confidence bands. For example if confidence is less than 10% then a limit cycle is deemed to be present, if confidence is greater than 70% then a limit cycle is not deemed present, otherwise the result is equivocal.

The same test can be used for the skewness statistic $S_k$ by replacing "center bar of the histogram" by "greater than zero" in steps 1 and 3 and noting that the expected value of S is n/2.

The key feature of this statistical test is that it accounts for the correlation between successively observed tracking error measurements, a phenomenon which invalidates the basic assumption of classical non-normality tests. A second advantage is that the test quantifies the main characteristic of the histogram distortion produced by common nonlinearities caused by friction in actuator/valves, so enhancing the sensitivity and accuracy of the test. The main advantage of using this process for on-line control malfunction diagnosis is that it uses only normal closed-loop operating data, no probing of the process is required.

Examples:

The following two examples demonstrate two cases of interaction and its effect on the ability of the invention to determine the root cause of a malfunction.

Figure 10:
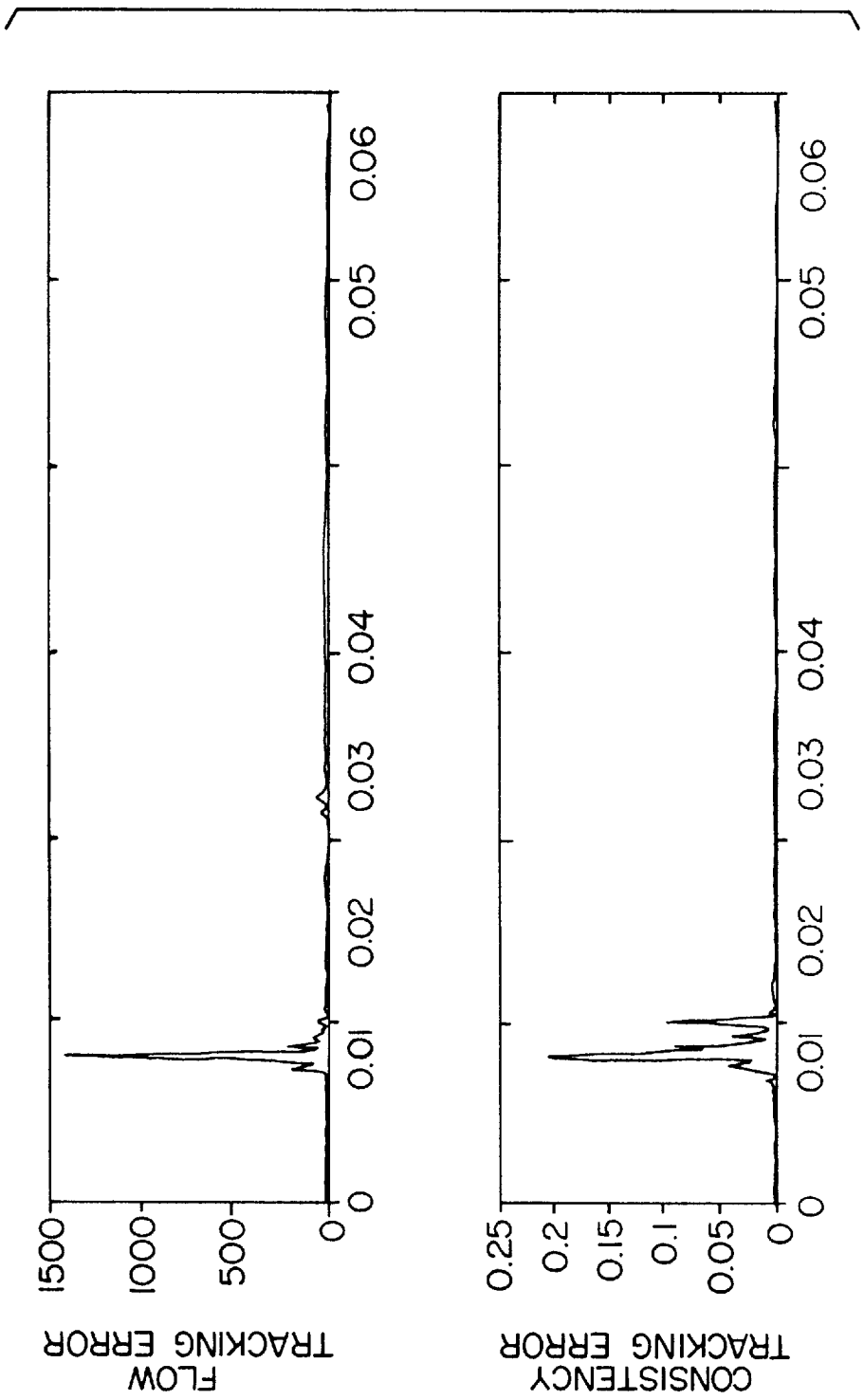

Case 1: FIG. 9 shows two time series depicting two controlled variables on a paper machine: the flow rate and consistency (dry solids mass per unit liquid mass) of the flow of broke pulp to the blending tank ahead of the machine. The flow control loop and the consistency control loop comprised the set of loops whose performance indices were greater than the preset threshold (dubbed "potentially malfunctioning"), among the larger preselected list of loops from which data was analyzed. The performance indices as calculated by the method shown in FIG. 1 were 9.65 and 2.51. The power spectra estimates obtained from the smoothed Fourier transform (with Daniel window size given by eq: 4) are shown in FIG. 10. Both the flow tracking error and the consistency tracking error exhibit a primary cyclical variation at a frequency of 0.0081 Hz. The proportion of the variance within a bandwidth of ±0.00125 Hz (±1% of the entire range) of the primary peak is 80% for the flow tracking error and 57% for the consistency tracking error; both these values are above the threshold level for designation of a primary resonance. No secondary peak has sufficient variance within a ±0.00125 Hz bandwidth to be designated a secondary resonance. In accordance with the preferred embodiments, the two control loops are assigned to the same single equivalence class of potentially interacting loops.

Application of eq: 5 yields modified indices of performance 1.92 and 1.09 respectively. In neither case is the frequency of the resonance outside the precomputed limits, and so in either case the "real" index could lie anywhere between the modified and unmodified index. Since both of the modified indices are in the "normal" range of 1–2, the results do not definitely isolate either loop as a source of malfunction independently of the other, and a manual bump test is required to make the distinction.

The hypothesis test on the tracking error histogram revealed a 3% confidence in the null hypothesis for the flow loop and a 45% confidence for the consistency loop. Consequently the conclusion is made that if the flow loop is the source of the malfunction, the cause is a nonlinearity in the loop such as a defective valve or actuator, and if the consistency loop is the source of the malfunction then the cause is a linear phenomenon such as poor choice of tuning constants. Subsequent tests identified the first loop as the cause of the problem and confirmed the diagnostic produced by the method. Repair of the valve position and realignment of the valve resolved the malfunction.

Figure 11:
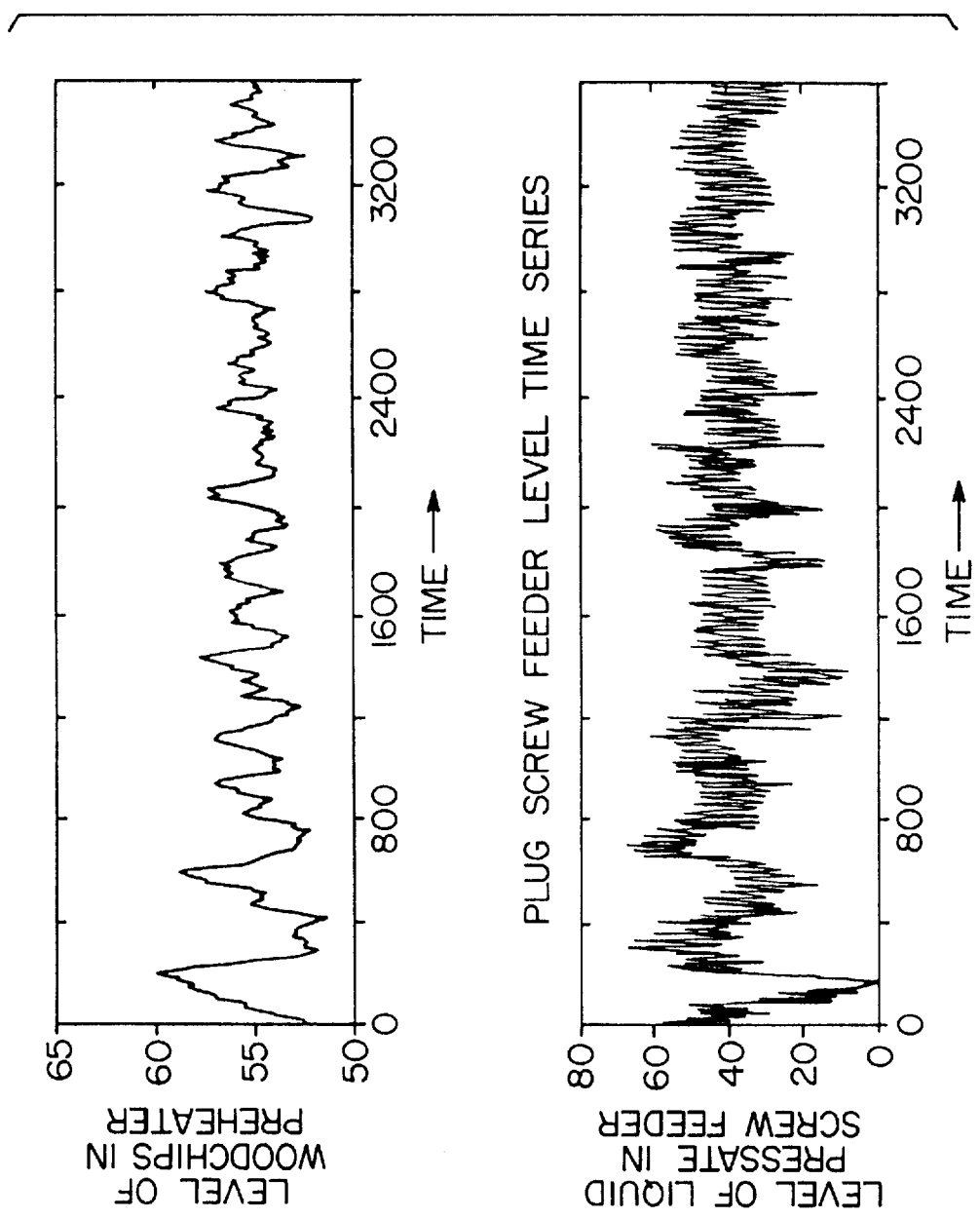
FIG. 11 shows the two level time-series for Example 2.
Figure 12:
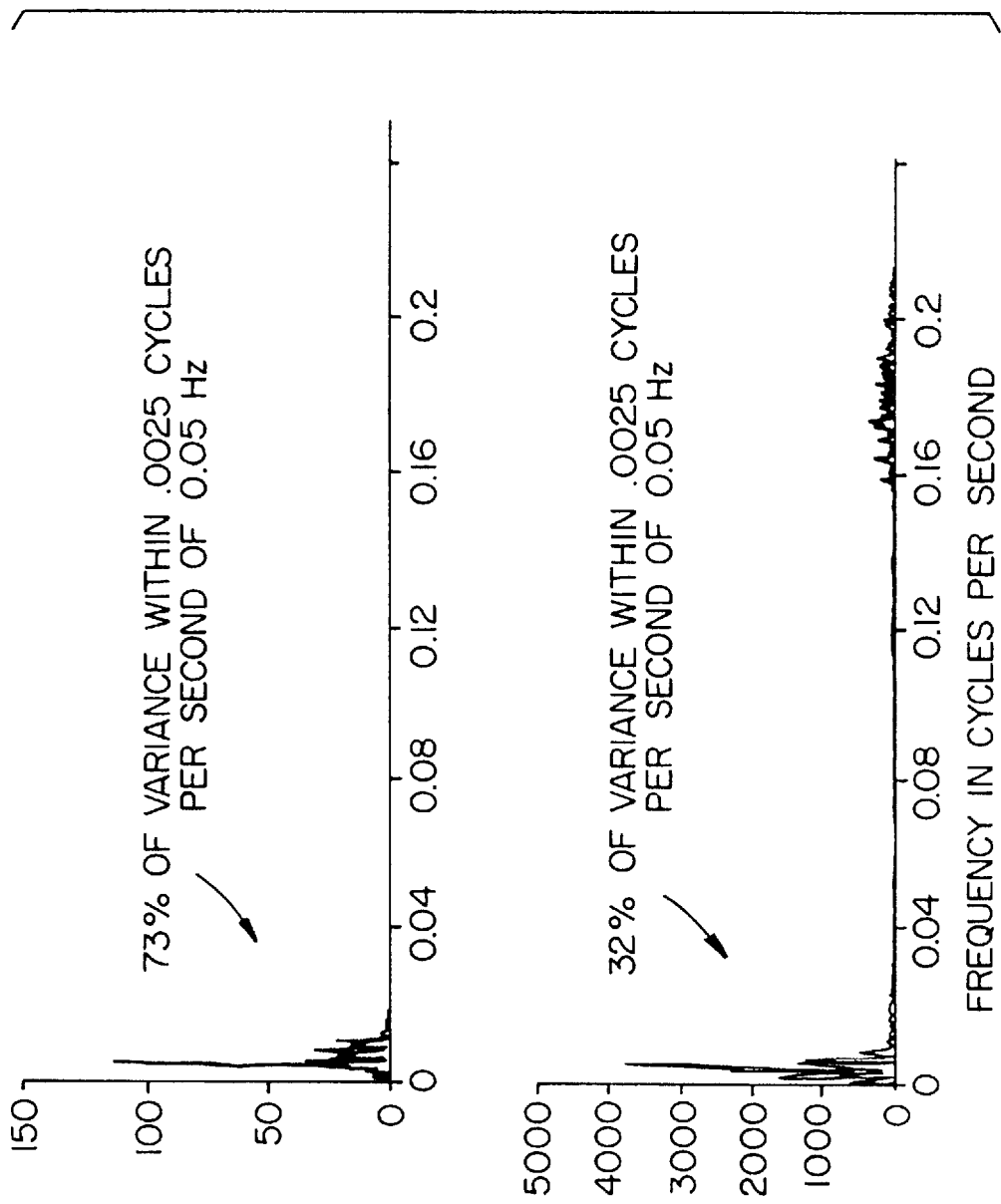
FIG. 12 shows the two level power spectra for Example 2.
Figure 13:
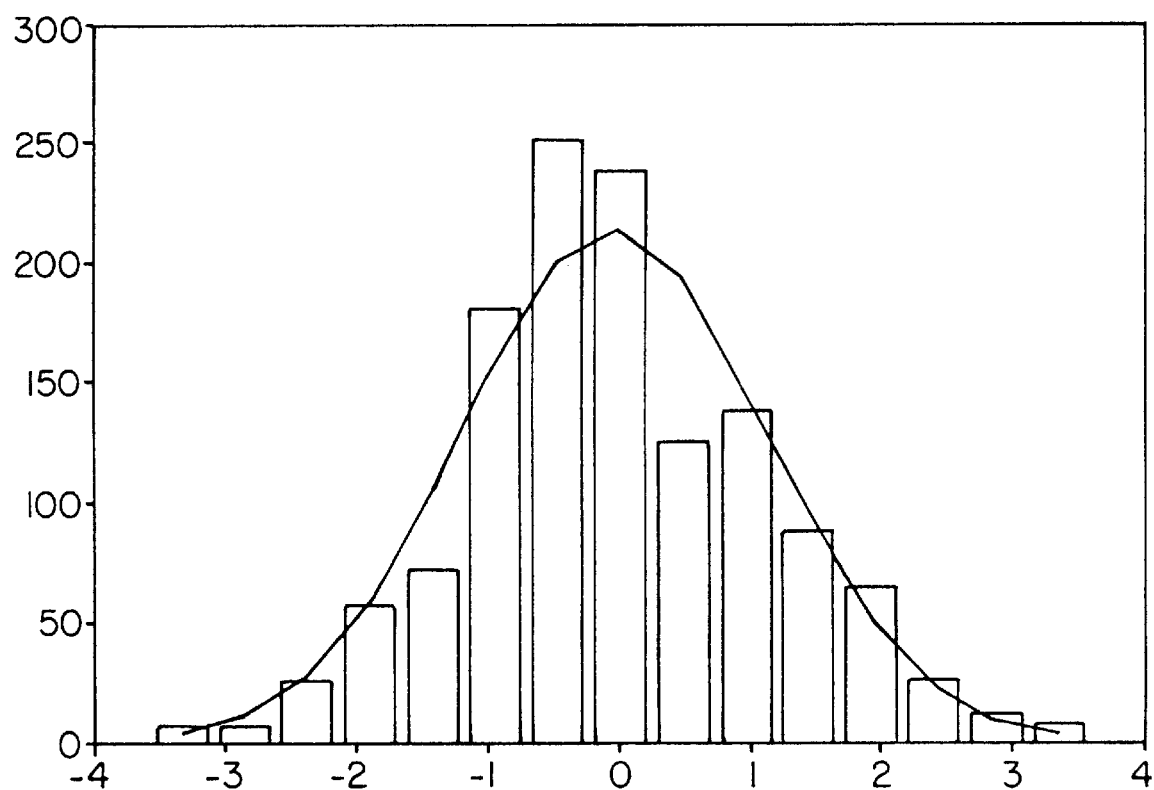
FIG. 13 shows the histogram of the preheater level tracking error in Example 2.

Case 2: FIG. 11 shows two time series depicting two controlled variables on in a thermo-mechanical pulp mill: the level of woodchips in a preheater and the level of liquid pressate in the plug screw feeder that receives chips from the preheater. As in case 1 the preheater level control loop and the plug screw level control loop comprised the set of "potentially malfunctioning" loops among the list of loops from which data was analyzed. In the former case the performance index was 348.7 and in the latter it was 4.27. The windowed power spectrum estimates are shown in FIG. 12. As in case 1 primary resonances occur in both loops, both at a frequency 0.005 Hz, accounting for 73% and 32% of the variance respectively. For the preheater level, no secondary peak has sufficient variance within a ±0.00125 Hz bandwidth to be designated a secondary resonance. However for the plug screw level a secondary resonance at 0.183 Hz was detected with an associated relative variance of 3% with a bandwidth ±0.000125 Hz. The coincidence of the two primary resonances causes the method to associate both loops with the same single equivalence class of potentially interacting loops, as in case 1. The modified indices of performance are 93.91 and 2.93 respectively, and in neither case is the resonance outside the preset limits. However in contrast to case 1, both modified indices are above the level of normally functioning loops, and it can thus be concluded that both loops are malfunctioning independently of the evident interaction between them. The histogram test reveals confidences of 32% and 65% in the null hypothesis, and so both malfunctions are likely caused by linear defects.

Prior estimates can be obtained for the closed-loop resonant frequencies of two commonly occurring classes of process dynamics:

a) Self regulating processes with linear dynamics which are approximately described by a first order stable transfer function and a delay;

b) Non-self regulating processes with negligible delay.

The two estimates which follow are independent of the controller tuning constants: For a process whose dynamics are described by a), any closed-loop resonant frequency is bounded below by the smallest frequency w (in radians per sample) which satisfies $$\frac{\sin w}{1 + \frac{1}{\alpha} - \cos w} > \tan\left(\frac{\pi}{3} - (d+1)w\right) \qquad (9)$$

where $\alpha$ is the open loop time-constant and d is the open loop dead-time.

For a process whose dynamics are described by b), any closed loop resonant frequency is bounded above by: 30/ (time for process variable to change 1% for a 1% change in the manipulated variable). The quantity on the denominator above is considered to be a generalization of the time-constant for non-self regulating processes when setting up the prior information files for those loops. Both these bounds are derived from classical Nyquist frequency response methods and some assumptions about the actuator in the latter case. Other, similar bounds can be derived in the same manner for different assumptions.

FIG. 14A illustrates a paper making machine 101, which has plural local control units 103 controlling different parts of the machine. The control units are comprised of various closed loop control loops of well known structure. The local control units are connected to a distributed control system bus 105, which bus is connected via a computer gateway 107 and a network link 109 to a computer 111, having a display.

In operation, a stream of data comprised of a measurement by the local control units of a variable being controlled by each control loop, and a target or set point for each control loop, is passed via the local control units 103 via the bus 105, gateway 107 and network link 109 to the computer 111, where the remainder of the process already described is further carried out.

It should be understood that the process can be carried out using the structure and elements to be described below with reference to FIGS. 14B, 15, 16 and 17. Alternatively, the computer 111 can simulate the structures to be described below.

Figure 14B:
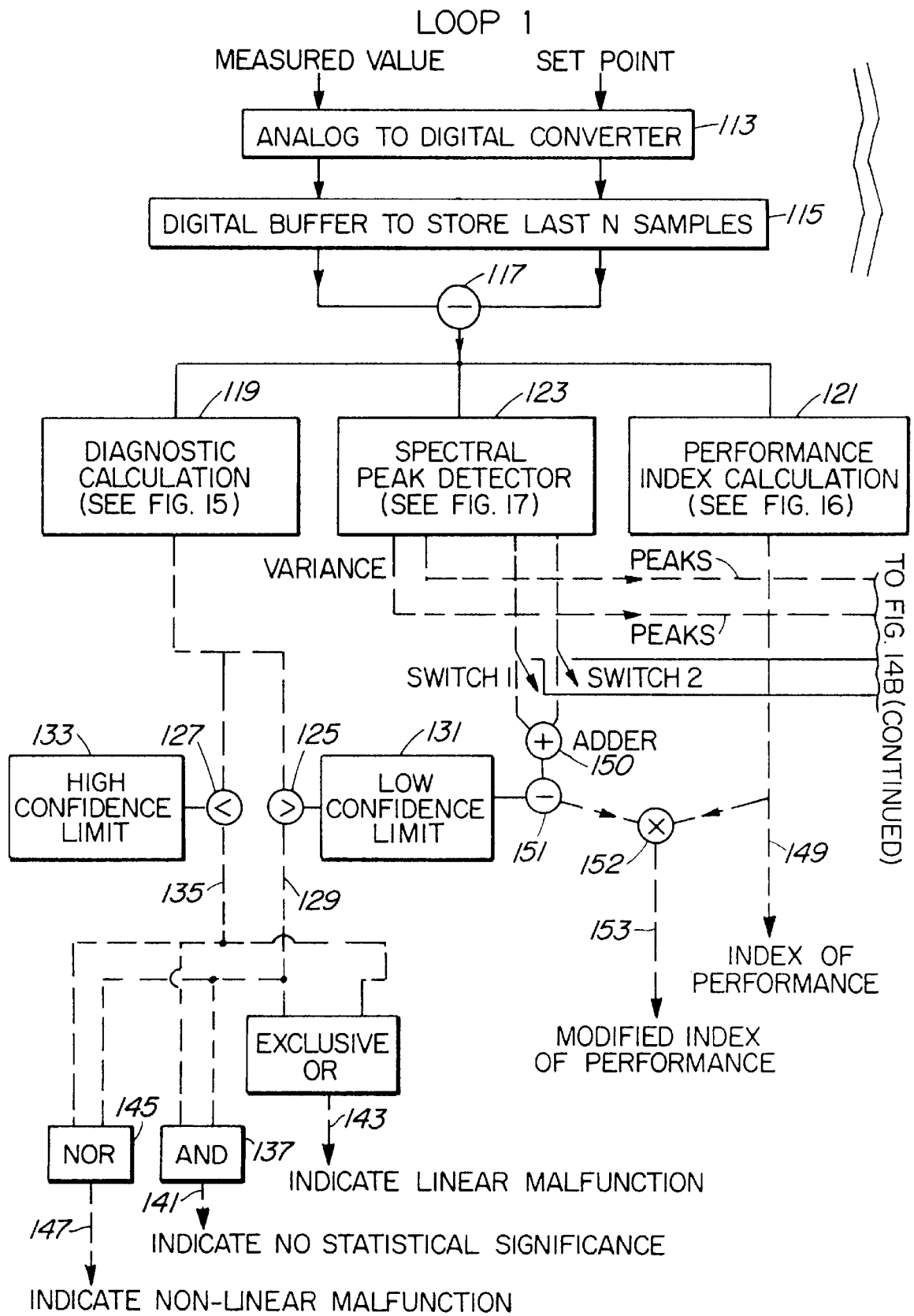
Figure 14B:
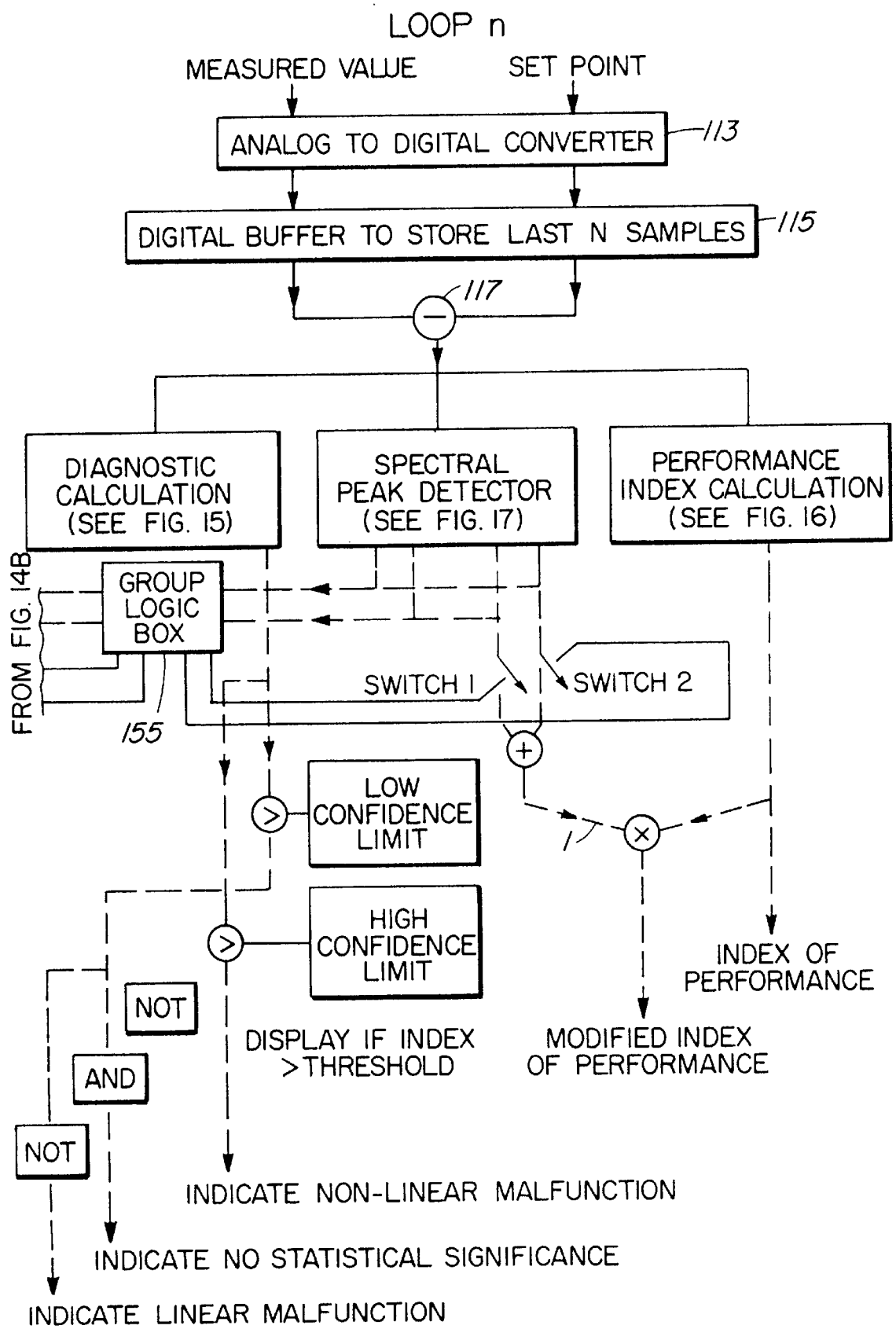

FIG. 14B illustrates a basic block diagram of a structure which can implement the inventive process. The aforenoted variables being controlled and the target or set points are sampled by the local control units, and are converted by analog to digital converters 113 for each of the n control loops to digital form, and the last N samples of each are stored in a buffers 115. The measured value of each controlled variable is then subtracted from the associated set point in corresponding subtractors 117, to obtain a sequence of digital data value signals representing the tracking error for each loop.

The tracking error signals for each loop are applied to a diagnostic evaluator 119 which is described in more detail with reference to FIG. 15, to a performance index determinator 121 which is described in more detail with respect to FIG. 16, and to a spectral peak detector which is described in more detail with respect to FIG. 17. The outputs of these subsystems are signals representing single values rather than data sequences.

An output signal of the diagnostic block 119 is a figure of confidence in the null hypothesis that the probability density function of the input sequence is normally distributed, i.e. that it has a purely Gaussian distribution. To interpret this figure of confidence, this signal is compared with two limits (confidence low limit, and confidence high limit) in respective comparators 125 and 127, the limits being provided by constant signal generators 131 and 133. The threshold or limit signals applied by generators 131 and 133 are compared with the figure of confidence signal in comparators 125 and 127 respectively, and an output signals are generated to signal paths 129 and 135 respectively indicate that the indexes exceed the limit signals.

The signals indicating exceeding of the confidence high and low limits are simultaneously applied to NOR gate 145, AND gate 137, and exclusive OR gate 134. The output signal of NOR gate 145 is applied to a signal path 147, which when high indicates a nonlinear malfunction in the control loop. The output signal of the AND gate 137 is applied to signal path 141, which when high indicates a linear malfunction of the control loop. The output signal of the exclusive OR gate 134 is applied to signal path 143, which when high indicates that there is no statistical significance of the null hypothesis form the diagnostic evaluator.

The output signal of the performance index determinator 121 on line 149 is the nonlinear performance index for the control loop in question.

The spectral peak detector 123 provides four output signals: the frequencies of any secondary and primary spectral peaks, and the proportion of the total variance (within a preset bandwidth) accounted for by those primary and secondary peaks.

The pair of the output signals of the spectral peak detector representing the proportion of the total variance accounted for by those primary and secondary peaks are passed through respective switches X and Y (for each loop) and are applied to adder 150. The output is subtracted from "1" in subtractor 151, and the result is multiplied in multiplier 152 from the performance index output from performance index determinator 121 on line 149, to provide a modified index of performance on line 153.

These output signals for all of the n spectral peak detectors are assigned into equivalence classes, as follows.

Group logic 155 receives the frequencies of the spectral peak output signals from the each of the spectral peak detectors 123, and assigns loops into equivalence classes, according to the following conditions:

(a) A primary spectral peak (accounting for more than a predetermined proportion of the variance) for one loop coincides with either a primary or secondary spectral peak in another loop (that accounts for more than a predetermined proportion of the variance);

(b) A secondary spectral peak (accounting for more than a predetermined proportion of the variance) for one loop coincides with either a primary or secondary spectral peak in another loop (that accounts for more than a predetermined proportion of the variance);

(c) If criteria (a) is satisfied for a given loop, then switch X is closed for that loop. If criteria (b) is satisfied for a given loop, then switch Y is closed for that loop.

This action has the effect of setting the modified performance index on line 153 equal to the performance index scaled down by the variance proportion of any significant spectral peak(s) which are in common with other loops and cause the loop in question to be assigned to an equivalence class.

Figure 15:
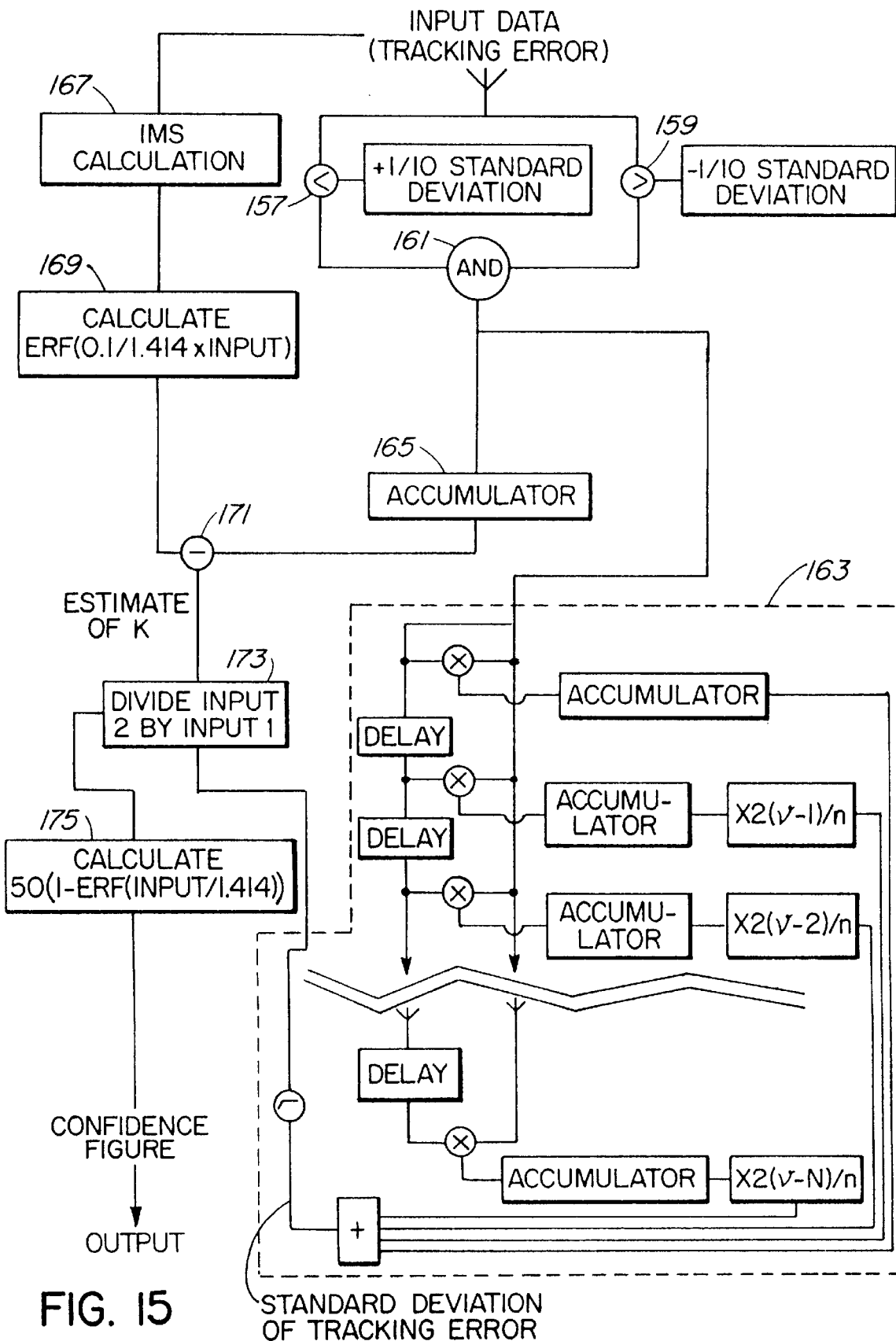
FIG. 15 is a block diagram of the diagnostic calculation block of FIG. 14.

The details of an embodiment of the diagnostic evaluator 119 is illustrated in FIG. 15. The tracking error signal from subtractor 117 (FIG. 14B) is applied to a pair of comparators 157 and 159 (FIG. 15). Also applied to comparator 157 is a constant signal representing +0.1 standard deviation of zero, and also applied to comparator 159 is a signal representing −0.1 of a standard deviation of zero. Comparator 157 outputs a signal which is 1 when the tracking error is smaller than +0.1 standard deviations of zero and zero otherwise and comparator 159 outputs a signal which is 1 when the tracking error is larger than −0.1 standard deviation of zero. The outputs of the comparators 157 and 159 which are sequences comprising zeroes and ones are applied to AND gate 161, which has an output signal that is one when the tracking error is within the +0.1 and −0.1 standard deviation bounds of zero and is zero otherwise, in the form of a sequence of ones and zeros, with the value of one when the tracking error is within the aforenoted bounds.

This signal is applied to processor 163 which determines the standard deviation of the statistic k, in accordance with equation (7) described earlier.

The sequence of ones and zeros is also summed in accumulator 165, resulting in an output signal therefrom that represents a single number which is equal to the number of points in the original input sequence having absolute value within the ±0.1 standard deviations bounds of zero.

The tracking error is also applied to a root means square calculator 167, where standard deviation is calculated, the resulting signal being processed in processor 169 by $e^{(0/(1.414 \times input))}$ (where "input" is the output signal of calculator 167) and then multipled by the total number of samples, to provide an estimate of the expected value of the output of accumulator 165 under the null hypothesis that the probability density function of the tracking error is normal.

The estimate of K signal is obtained as the output of subtractor 171, which is the difference between the signal which is the output of the calculation block 169 and the signal which is output from accumulator 165. This signal is applied to divider 173. The estimated standard deviation of the statistic k obtained in processor 163 is also applied to divider 173, where it is divided into the signal output from subtractor 171. The result is processed through processor 175 where it is transformed by $50(1-e^{(input/1.414)})$, where "input" is the output signal from divider 173, the result being the estimate of K relative to its estimated standard deviation.

The ratio K to its estimated standard deviation as processed in processor 175 is a signal representing the confidence figure described earlier with reference to FIG. 14B.

The processor 163 can be realized by multiplying the output signal from AND gate 161 with itself and progressively delayed versions thereof, and accumulating the result in respective accumulators. The output of the accumulator of the nondelayed multiplied output signal, and the outputs of the other accumulators multiplied by $2(n-x)/n$ (where x represents the number of delay elements in series and n represents the number of points in the original input sequence) are added together and the result forms the standard deviation of the tracking error signal.

Figure 16:
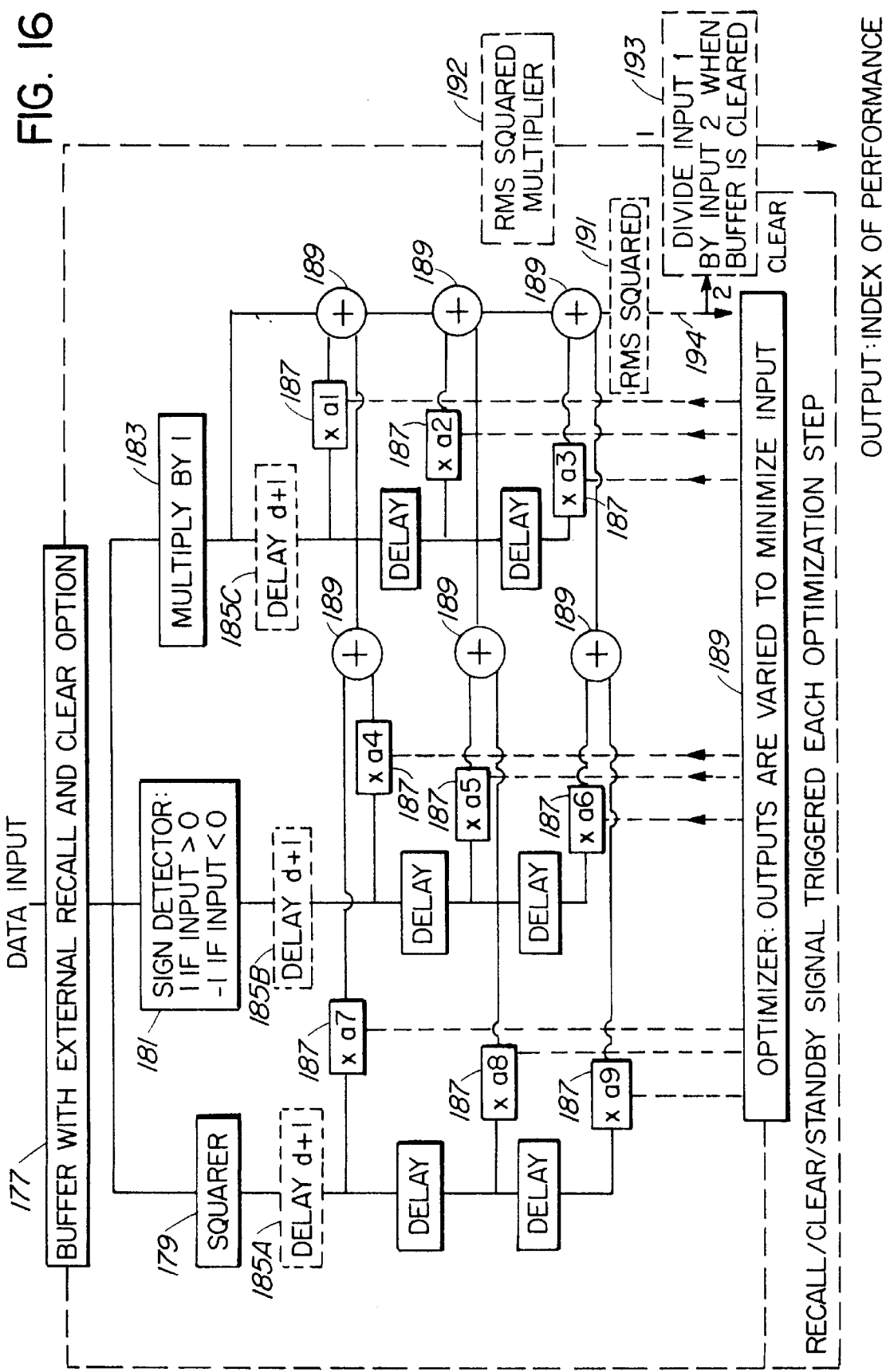
FIG. 16 is a block diagram of the performance evaluation block of FIG. 14.

FIG. 16 illustrates an embodiment of a performance index determinator 121 (FIG. 14B). The input signal from subtractor 117 is stored in a buffer 177.

When triggered, the buffer transmits the stored signal to a squarer 179, to a sign detector 181, and to a multiplier by 1, 183.

The outputs of the squarer 179, sign detector 181 and multiplier 183 are applied to tapped delay lines 185A, 185B and 185C, wherein tapping weights 187 are variable under control of an optimizer processor 189. The optimizer processor 189 varies the tapping weights to minimize its input signal.

The output signals from delay line, weighted by the tapping weights, are summed in adders 189, and the resulting sums are added to the undelayed input signal from the output of multiplier by 1, 183.

It should be noted that the first delay element of the tapped delay line delays the input signals by d+1 samples, where d is the dead-time of the control loop under consideration.

The variance of the resulting sequence of sums is then computed, by dividing the rms squared (in multiplier 192) of the signal stored in the buffer 177 by the output signal from rms calculator 191, in divider 193. The quotient, representing the index of performance, is inversely related to the accuracy of prediction of current observations of the input sequence of 183 or 117 by linear combinations as represented by tapping weights of the algebraic functions of past observations.

The optimizer 189 then repeats the cycle for new values of the tapping weights, retriggering the buffer 177 to recall the input sequence, recalculating the approximation error for modified tapping weights, until the variance of the sum sequence 194 is minimized. Upon completion of the optimization the variance of the input signal is divided by the minimum variance of the sum sequence to yield the performance index, which is the final output of the performance index determinator block 121.

Figure 17:
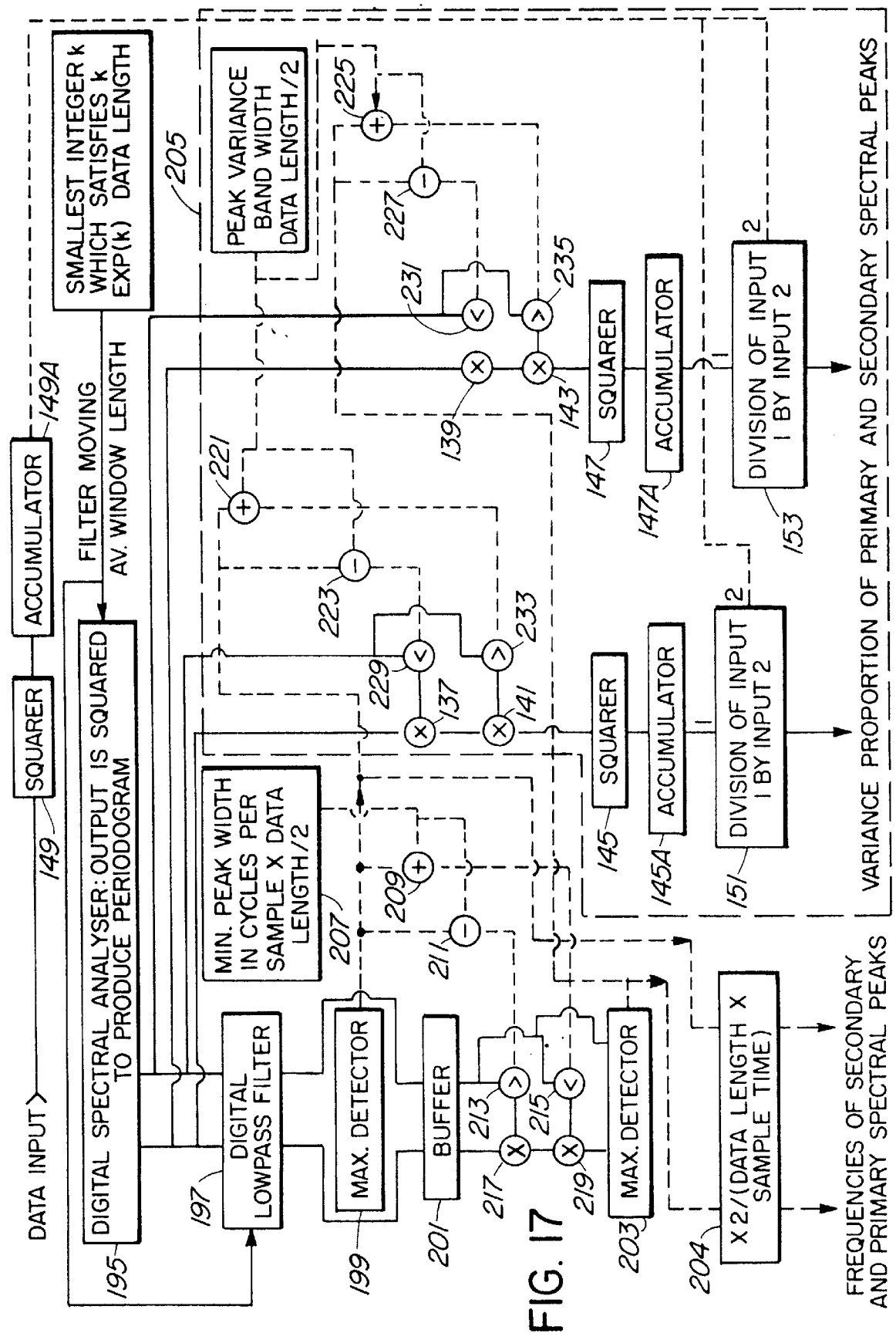
FIG. 17 is a block diagram of the spectral peak detector block of FIG. 14.

An embodiment of the spectral peak detector 123 (in FIG. 14B) is illustrated in FIG. 17. The input signal from the subtractor 117 is applied to a digital spectral analyzer 195, whose output signals are a sequence of squared absolute values of the Fourier transform of the input signal and the sequence of corresponding frequencies. The first output signal is passed through a symmetrical non-causal moving average digital filter 197, the width of the moving average of which is set by a smallest integer k which satisfies $ke(^k)$<data length.

The output signal of the filter 197 and the second (frequency) output of the spectral analyzer 195 are applied to a maximum detector 199, which computes the frequency of the maximum point of the filtered spectrum. This peak is then identified with the primary spectral peak.

The filtered spectrum from filter 197 and the sequence of frequencies are then stored in another buffer 201. All spectral values of the signal stored in this buffer that are within a certain bandwidth of the frequency of the primary spectral peak are then set to zero by a sequence of operations to be described below.

The frequency at the maximum of this modified spectrum is then computed by a second maximum detector, and this frequency is identified with the secondary spectral maximum which is output from detector 203. Frequencies are then multiplied by (2/(data length x sample time)), to obtain the frequencies of the secondary and primary spectral peaks, which are one pair of the output signals of spectral peak detector 123.

The elements in the dashed line block 205 calculate the proportion of the variance within a preset bandwidth of the calculated frequencies of the primary and secondary spectral peaks, the other pair of output signals of the spectral peak detector 123.

Setting the spectral values within a certain bandwidth of the frequency of the primary spectra to zero is obtained by providing a signal from a processing circuit 207 which represents the minimum peak width in cycles per sample x (data length)/2, in periodogram ordinates. This signal is added to the output signal of the maximum detector 199 in adder 209 and is subtracted from the same signal in subtractor 211. The result is compared with the second frequency sequence output signal of the spectral analyzer 195 in comparators 213 and 215.

If any element of the output of the spectral analyzer is less than the corresponding output of subtractor 211, the corresponding output of the comparator 213 is one, otherwise it is zero. If any element of the output of the spectral analyzer 195 is greater than the corresponding output of the adder 209, the output of comparator 215 is one, otherwise it is zero. The outputs of comparators 213 and 215 then multiply the first output of buffer 201 in multipliers 217 and 219. The result, and the output of the buffer 201, are applied to the maximum detector 203.

The proportion of the variance within a preset bandwidth of the calculated frequencies of the primary and secondary spectral peaks are determined by applying the output of the maximum detector 199 to adder 221 and to subtractor 223 to which a signal is applied representing the (peak variance bandwidth)x(data length)/2. The output signal of the maximum detector 203 is applied to subtractor 223 and to subtractor 227 to which the signal is applied representing the (peak variance bandwidth)x(data length)/2. The output signals of subtractors 223 and 227 are applied to respective comparators 229 and 231, to which the second (frequency) output of the digital spectral analyzer 195 is applied.

In the event that this signal exceeds the output of subtractor 223 or 227 the output of the respective comparator 229 or 231 is one, otherwise it is zero.

Similarly, the outputs of adders 221 and 225 are applied to inputs of comparators 233 and 235 to which the same output of the digital spectral analyzer 195 is applied. In the event that this signal is less than the output of adder 221 or 225, the output of the respective comparator 233 or 235 is one, otherwise it is zero. The outputs of comparators 229, 233, 231 and 235 are multiplied in respective multipliers 137, 141, 139 and 143 with the first (spectrum) output signal of the spectral analyzer 195.

The resulting outputs of multipliers 141 and 143 are applied to respective multipliers 145 and 147 where they are squared and the sequences summed. The resulting signals are divided in dividers 151 and 153 by the sum of the squares of the input signal to the spectral analyzer calculated by processor 149.

The output signals of the dividers 151 and 153 represent the variance proportion of the primary and secondary spectral peaks, and the output of processor 204 provides the frequencies of the primary and secondary spectral peaks, which are the four output signals, noted in the earlier description of FIG. 14B, from spectral peak detector 123.

A person understanding this invention may now conceive of alternative structures and embodiments or variations of the above. All of those which fall within the scope of the claims appended hereto are considered to be part of the present invention.

I claim:

1. A method of diagnosing a malfunction of a process control system which includes at least one closed loop control loop comprising measuring a histogram of tracking error of said control loop, determining distortion of said tracking error relative to a Gaussian distribution, and indicating a malfunction in the process in the event a deviation from said Gaussian distribution of said tracking error exceeds predetermined limits, wherein said distortion (K) is measured by subtracting from a height of a tracking error histogram bar of said histogram centered on zero, a number of samples multiplied by an area between a pair of limits defining a normal density about a mean of said histogram, and then indicating a malfunction in the process in the event a value of K is different from 0 by a predetermined amount.

2. A method as defined in claim 1 in which the malfunctioning indicating step is carried out by:

(a) if a sequence of observed tracking errors is x(k), where the index k ranges from 1 (the start of the sequence) to n (the end of the sequence), generate a new sequence y(k) by the following rule:
if x(k) is within the center bar of the histogram, then y(k):=1, otherwise y(k):=0, then subtract the sample mean of y from each element y(k),
(b) compute an autocorrelation function for the sequence y(k) up to a fixed lag N, wherein an autocorrelation function sequence is R(j) where j ranges from −N to +N,
(c) determine a variance using the transform $$Var(S) = \sum_{k=1}^{n-1} 2(n-k)R(k) + nR(0)$$

where R(.) is the estimated autocorrelation sequence,
n is the number of samples,
S=the sum of the sequence y(k) prior to removal of the sample mean in (a), which is the height of the center bar of the histogram, and the expected value of S is equal to the area under the Gaussian curve in the range of the center histogram bar multiplied by the number of samples,
(d) determine a confidence value C, $$\text{where } C = nerf\left(\frac{x}{1.414}\right),$$

χ=absolute value of the difference between the expected value of S and its computed value divided by the estimated standard deviation of S, and
(e) set confidence bands and determine whether C is contained within the bands.

3. A method of automatic assessment of control loop performance of an industrial machine comprising:
(a) collecting operating data comprising time series of controlled variable measurements and control loop set points simultaneously from predetermined control loops, for a period of at least approximately 100 times a longest time constant of said predetermined control loops,
(b) subtracting measured variable data from set point data to obtain tracking errors,
(c) determining an amount by which observed variance of a tracking error exceeds a minimum value, after non-linear elements have been removed from a loop, exploiting prior estimates of process time constant and dead-time to provide a raw index,
(d) testing for any interactions between control loops which may be inflating in an abnormal manner an estimate of said raw index,
(e) determining a modified raw index for a particular loop in the event said inflated estimates are detected, and
(f) distinguishing between control loops that are malfunctioning, those that are not malfunctioning, and those that are possibly malfunctioning and are perturbed by interacting malfunctioning control loops, based on said raw index and said modified raw index.

4. A method as defined in claim 3 further comprising:
(i) computing a histogram of the tracking error for each potentially malfunctioning loop,
(ii) quantifying kurtosis of each histogram by determining height of a center bar of said histogram relative to an expected height wherein the expected height is determined by an assumption that tracking error is normally distributed with a sample mean and sample variance,
(iii) calculating a statistical significance of said kurtosis in a downward direction, taking into account any inter-sample correlation of tracking error time-series, and
(iv) displaying said statistical significance as a diagnostic measure indication.

5. A method as defined in claim 3, in which said raw index (IN) is determined by observing tracking error variation (O) in said loop, determining a variance of conditional expectation (V) from measurements and samples in the past, and processing O/V to obtain IN.

6. A method as defined in claim 5, wherein V is determined by:
(a) subtracting a measured variable from a set point to obtain a tracking error,
(b) extracting prior measured variable data for said loop,
(c) in the event a sample time T of said variable is at least approximately 0.1 times the dominant open loop time constant of said loop, finding best least squares approximation of a vector of tracking error observations with linear combinations of tracking errors and successive tracking errors delayed by successive sample period delays, and
(d) in the event a sample time of said variable is smaller than approximately 0.1 times said dominant loop time constant, resample said variable at a sample interval approximately 5–10 times shorter than said dominant open loop time constant, and then find the best least squares approximation as in step (c).

7. A method as defined in claim 6 in which the step of calculating said raw performance index is comprised of determining an amount by which observed variance of a tracking error exceeds a minimum value, after non-linear elements have been removed from a loop, from prior estimates of process delayed time constant.

8. A method as defined in claim 6 in which step (d) is comprised of digital antialias filtering said variable and resampling said variable at a longer sample interval I which is approximately 5–10 times shorter than said open loop time constant, and expressing said longer sample intervals as said sample intervals.

9. A method as defined in claim 8 in which a cut off frequency of the antialiasing filter is between 10–20 times the reciprocal of the open loop time constant in radians per sample, and in which the resampling interval is approximately 0.1–0.2 times an estimated process time constant.

10. A method as defined in claim 6 including the step of determining the existence of drift in tracking error using a statistic D wherein D=maximum of ($|m1|$, $|m3|$) wherein m1 and m3 are means of the first third and third third of a time series of said tracking error, and providing a warning signal if D>standard deviation of the tracking error x $(12M/L)^{1/2}$, where m is a predetermined large number and L is the number of samples in the time series.

11. A method of automatic assessment of control loop performance of and industrial machine comprising:
(a) identifying a current control loop in a group of control loops,
(b) obtaining operating data and prior dynamic information for said control loop,
(c) calculating a raw performance index for said control loop,
(d) indicating said current control loop as potentially malfunctioning in the event said raw performance index is greater than a predetermined threshold,
(e) in the event said control loop is indicated as potentially malfunctioning, computing a fast Fourier transform of a tracking error, and filter products of said transform to remove spurious peaks, (f) identifying primary and secondary spectral peaks contributing more than a threshold variance in a predetermined bandwidth for said control loop, (g) selecting another control loop in said group of control loops and repeat steps (a)–(g) until a last control loop in said group has been processed, (h) divide potentially malfunctioning loops with approximately coincident spectral peaks into possibly interacting classes, (i) determine a modified performance index for all control loops belonging to a class, and (j) apply a histogram test to spectral peaks of all control loops in a class to determine a category of malfunction.

12. A method as defined in claim 11 including determining a drift of said operating data, and indicating from a value or a trend of said drift whether an upset condition exists, and in the event an upset condition exists, providing a warning indication.

13. A method as defined in claim 12 including carrying out the step of determining the presence of said drift by determining a statistic D for the drift tracking error of said loop, wherein D=maximum of $|m1|$, $|m3|$), wherein m1 and m3 are means of a first third and third third of a time series of tracking error, and indicating an upset condition if D>standard deviation of the tracking error x $(12M/L)^{1/2}$ where M is a predetermined large number and L is the number of samples in the tracking error time eries.

14. A method of determining a category of malfunction of a process comprising:

(a) tracking error variations of narrow spectral bandwidth in each of plural control loops of said process, (b) comparing spectral peaks of said error variations to detect coincidences of peaks which are indicative of interaction between said plural control loops, and (c) quantifying effects of said error variations which have said coincidences of peaks, and as a result determining malfunctioning of a control loop.

15. A method as defined in claim 14 performed on each control loop deemed to be malfunctioning, in which said error variation tracking step is comprised of evaluating a Fourier transform of said tracking error variations, windowing products of the Fourier transformation, choosing a Daniel window having bandwidth W periodogram ordinates such that W is a smallest integer which satisfies Wexp$^W$>L, and in which the spectral peak comparing step is comprised of estimating the frequency f1 of a first maximum of the estimated power spectrum, evaluating a center frequency f2 of any center peak by testing for a second maximum over frequencies excluded from an interval around the first maximum, evaluating a variance associated with said primary and secondary maxima by computing an area under the power spectrum estimate over an interval of fixed bandwidth about said frequencies f1 and f2, and indicating the presence of a spectral resonance at a corresponding frequency f1 or f2 in the event either variance exceeds predetermined proportions of overall tracking error variance.

16. A method as defined in claim 15 including the step of forming classes of control loops by associating control loops in a class, wherein said frequencies f1 and f2 of a control loop are adjacent to either said f1 or f2 of another control loop by a small predetermined amount.

17. A method as defined in claim 7 including determining a category of malfunction of a process carried out by said industrial machine comprising:

(a) tracking error variations of narrow spectral bandwidth in each of plural control loops of said process, (b) comparing spectral peaks of said error variations to detect coincidences of peaks which are indicative of interaction between said plural control loops, and (c) quantifying effects of said error variations which have said coincidences of peaks, and as a result determining malfunctioning of a control loop.

18. A method as defined in claim 17 performed on each control loop deemed to be malfunctioning, in which said error variation tracking step is comprised of evaluating a Fourier transform of said tracking error variations, windowing products of the Fourier transformation, choosing a Daniel window having bandwidth W periodogram ordinates such that W is a smallest integer which satisfies Wexp$^W$>L, and in which the spectral peak comparing step is comprised of estimating the frequency f1 of a first maximum of the estimated power spectrum, evaluating a center frequency f2 of any center peak by testing for a second maximum over frequencies excluded from an interval around the first maximum, evaluating a variance associated with said primary and secondary maxima by computing an area under the power spectrum estimate over an interval of fixed bandwidth about said frequencies f1 and f2, and indicating the presence of a spectral resonance at a corresponding frequency f1 or f2 in the event either variance exceeds predetermined proportions of overall tracking error variance.

19. A method as defined in claim 18 including the step of forming classes of control loops by associating control loops in a class, wherein said frequencies f1 and f2 of a control loop are adjacent to either said f1 or f2 of another control loop by a small predetermined amount.

20. A method as defined in claim 19 including the steps of determining a modified index of performance as a determination of malfunction for control loops belonging to either a class of potentially interacting control loops or a class of control loops in which a resonance is identified to be outside a predetermined range of wavelengths which resonance is caused by other than a limit cycle generated due to the presence of a severe nonlearity in a control loop.

21. A method as defined in claim 20 in which said determining step is comprised of processing the signal values: (modified index)=(raw index)×(1-proportion of the tracking error variance associated with a resonance suspected of being imposed externally to a control loop).

* * * * *